United States Patent [19]
Dalgewicz, III et al.

[11] Patent Number: 6,077,904
[45] Date of Patent: Jun. 20, 2000

[54] ELEVATED TEMPERATURE DIMENSIONALLY STABLE, IMPACT MODIFIED POLYESTER WITH LOW GAS PERMEABILITY

[75] Inventors: Edward J. Dalgewicz, III, Millstone, N.J.; John Bond, Pittsburgh, Pa.; Richard Freundlich, Plainsboro, N.J.

[73] Assignee: Lawson Mardon Thermaplate Corporation, Piscataway, N.J.

[21] Appl. No.: 07/914,388

[22] Filed: Jul. 17, 1992

Related U.S. Application Data

[63] Continuation of application No. 07/903,076, Jun. 22, 1992, abandoned, which is a continuation-in-part of application No. 07/863,204, Apr. 3, 1992, Pat. No. 5,344,912, which is a continuation of application No. 07/829,478, Feb. 3, 1992, abandoned.

[51] Int. Cl.⁷ ........................................ C08L 67/02
[52] U.S. Cl. ............................. 525/64; 525/67; 525/123; 525/166; 525/177; 525/176; 524/401; 524/503; 524/507; 524/513
[58] Field of Search ...................... 524/401, 503, 524/507, 513; 525/64, 67, 123, 166, 176, 177

[56] References Cited

U.S. PATENT DOCUMENTS

| | | | |
|---|---|---|---|
| 3,562,200 | 2/1971 | Jones et al. | 525/176 |
| 4,022,748 | 5/1977 | Schlichting et al. | 525/64 |
| 4,061,706 | 12/1977 | Duffield et al. | 264/90 |
| 4,117,034 | 9/1978 | Steffancin | 525/64 |
| 4,244,859 | 1/1981 | Sugie et al. | 525/64 |
| 4,267,286 | 5/1981 | Campbell | 525/176 |
| 4,283,326 | 8/1981 | Charles et al. | 525/64 |
| 4,292,233 | 9/1981 | Binsack et al. | 525/69 |
| 4,342,846 | 8/1982 | Silberberg | 525/64 |
| 4,476,170 | 10/1984 | Jabarin | 428/35 |
| 4,482,672 | 11/1984 | Neuray et al. | 525/67 |
| 4,525,529 | 6/1985 | Ohmura et al. | 525/64 |
| 4,535,025 | 8/1985 | Jabarin | 428/220 |
| 4,535,124 | 8/1985 | Binsack et al. | 525/67 |
| 4,582,876 | 4/1986 | Weemes et al. | 525/64 |
| 4,607,075 | 8/1986 | Baum et al. | 524/449 |
| 4,666,973 | 5/1987 | Heinz et al. | 524/504 |
| 4,707,512 | 11/1987 | Maruyama et al. | 524/504 |
| 4,713,268 | 12/1987 | Carson | 428/35 |
| 4,742,109 | 5/1988 | Takahashi et al. | 524/504 |
| 4,820,795 | 4/1989 | Hirata et al. | 528/272 |
| 4,891,406 | 1/1990 | Bitterscheidt | 525/64 |
| 4,939,201 | 7/1990 | Seiler et al. | 524/504 |
| 4,948,842 | 8/1990 | Olivier | 525/286 |
| 4,952,629 | 8/1990 | Liang | 525/66 |
| 4,956,501 | 9/1990 | Sunseri et al. | 525/64 |
| 4,968,731 | 11/1990 | Lausberg et al. | 523/436 |
| 4,977,217 | 12/1990 | Sunseri et al. | 525/286 |
| 4,985,493 | 1/1991 | Eckel et al. | 525/67 |
| 5,075,374 | 12/1991 | Wallach | 525/67 |
| 5,086,118 | 2/1992 | Ohmae et al. | 525/176 |
| 5,106,567 | 4/1992 | Demerest et al. | 264/503 |
| 5,322,663 | 6/1994 | Lai et al. | 525/67 |

FOREIGN PATENT DOCUMENTS

| | | |
|---|---|---|
| 0 081 144 | 6/1983 | European Pat. Off. . |
| 0221336 | 5/1987 | European Pat. Off. . |
| 582 383 A1 | 2/1994 | European Pat. Off. . |
| 54-043972 | 4/1979 | Japan . |

OTHER PUBLICATIONS

Preston et al., "Effect of Crystallinity on Gas Permeation in Miscible Polycarbonate–Copolyester Blends", *Journal of Applied Polymer Science*, vol. 29, pp. 845–852 (1984).

Perkins, "Effect of molecular weight and annealing temperature on the oxygen barrier properties of oriented PET film", *Polymer Bulletin*, vol. 19, pp. 397–401 (1988).

*Primary Examiner*—Rachel Gorr
*Attorney, Agent, or Firm*—Venable; Marina V. Schneller

[57] ABSTRACT

Polyester composition with improved impact properties, improved oxygen permeability and improved dimensional shrinkage during heating. Impact modifiers are dissolved into a molten polyester to form a eutectic alloy. On slow cooling, the eutectic alloy of the invention freezes to form a mixture of particles of the impact modifier embedded in a matrix of the polyester. By controlling the solidification of the melt, the size and distribution of the precipitates from the melt can be controlled, which allows control of the mechanical properties. The precipitation can also be controlled either by homogenous nucleation or by heterogeneous nucleation through the addition of a nucleating agent or the introduction of a suitable surface for nucleation. The invention also provides a process of manufacturing the above polyester, an article comprising this polyester and a process for making this article. The crystalline polyester article is useful as a container for microwavable, ovenable and/or frozen foods, and has improved gas barrier properties, impact strength, and post-mold dimensional stability between −60° C. and 200° C.

30 Claims, 11 Drawing Sheets

ELEVATED TEMPERATURE DIMENSIONALLY STABLE, IMPACT MODIFIED POLYESTER WITH LOW GAS PERMEABILITY

CROSS REFERENCE TO RELATED APPLICATIONS

This application is a continuation of U.S. patent application of Dalgewicz, et al., U.S. Ser. No. 07/903,076, filed June 22nd, 1992 now abandoned, which is a continuation-in-part of U.S. patent application Ser. No. 07/863,204, filed Apr. 3rd, 1992, now U.S. Pat. No. 5,344,912, which is a continuation of U.S. patent application Ser. No. 07/829,478, filed Feb. 3, 1992, all abandoned, the entire specifications of which are incorporated herein by reference. The present application is also related to allowed U.S. application Ser. No. 07/165,370, now U.S. Pat. No. 5,106,567, and Canadian patent No. 1,293,349, the contents of which are also incorporated herein by reference.

BACKGROUND OF THE INVENTION

1. Field of the Invention

The invention relates to a thermoplastic crystallizable impact modified polyester composition having improved gas barrier and dimensional stability characteristics, method of making and articles made of this composition.

2. Technology Review

Polyesters have heretofore been widely used in the food package industry, including blister packs for meats, containers for frozen foods, ovenable and microwavable ("dual ovenable") trays and carbonated beverage bottles. A major effort in such packaging applications has been directed toward reducing the gas permeability of the package, since a decrease in such permeability will lead to a longer shelf life of the food product, be it at frozen, refrigerated or ambient temperature storage. Another focus of great effort in the food packaging industry is the dimensional stability of the package over long periods of time at ambient temperature or upon heating of the contents in either microwave or conventional ovens. Of particular concern in this regard are the breakage of seals and warping due to excessive shrinkage of the container during retort or any of the thermal sterilization processes. Still another effort of great focus is the impact strength of the package at low temperatures. Improved impact strength of the package allows for greater durability at low temperature applications which translates to greater versatility of the packaging product.

A number of prior patents have addressed the above-mentioned concerns, for the most part individually. As a result, for example, polyester compositions that are particularly suitable as carbonated beverage containers due to there low gas permeability, are generally unsuitable for applications and processes requiring elevated temperatures, as these materials generally exhibit excessive shrinkage and warping at these higher temperatures. Examples of such prior activity include:

U.S. Pat. No. 4,560,741 discloses a polyester resin derived from a $C_{(2-8)}$ diol, oxydiacetic acid and naphthalene dicarboxylic acid having improved resistance to gas permeability as compared to polyethylene terephthalate homopolymers.

U.S. Pat. No. 3,960,807 discloses a heat-set article comprising a polymeric crack-stopping agent and a nucleant as having a good dimensional stability and impact resistance.

U.S. Pat. No. 4,463,121 discloses thermoformed articles of partially crystallized polyethylene terephthalate and a polyolefin, as having improved impact resistance and high temperature dimensional stability.

U.S. Pat. No. 4,572,852 discloses a crystalline polyethylene terephthalate/polyolefin article as having high dimension stability.

U.S. Pat. No. 4,618,515 discloses a polyethylene terephthalate wide mouth bottle wherein the neck portion has higher thermal and strain crystallinity than the rest of the bottle, such that the neck is more resistant to shrinkage during a hot-fill process.

U.S. Pat. No. 4,535,025 discloses a biaxially-oriented, heat-set polyethylene terephthalate material with a density of over 1.4050 g/cc at 25° C. as having improved gas barrier properties.

U.S. Pat. No. 4,282,277 discloses a biaxially-oriented thermoset polymer seamless conduit as having good low temperature tensile impact strength.

U.S. Pat. No. 5,003,041 discloses blends of polyethylene terephthalate and trans-4,4'-stilbenedicarboxylic acid as having improved gas barrier properties as compared to polyethylene terephthalate homopolymer.

U.S. Pat. No. 4,764,403 discloses a biaxially-oriented, heat-set, multi-layer article with an inner layer of polyethylene terephthalate, as having high barrier properties and improved thermal stability.

U.S. Pat. No. 4,874,647 discloses a composition of polyethylene terephthalate and bisphenol-A polycarbonate for use in a polyester laminate. The composition is disclosed as providing for improved mechanical strength for a heat resistant polyester.

U.S. Pat. No. 4,061,706 discloses a continuous melt process for thermoforming thermoplastic polymers, preferably polyamides.

U.S. Pat. No. 4,261,473 discloses a container made of thermoplastic resin, oriented in at least one direction, as having an oxygen permeability of lower than $5\times10^{-11}$ cc-cm/cm$^2$-sec-cm Hg.

U.S. Pat. No. 4,469,270 discloses a shaped container of polyalkylene terephthalate with a crystallinity of at least 20 percent as determined by density measurement.

U.S. Pat. No. 4,996,269 discloses a thermoplastic resin of polyethylene naphthalate and a polyester elastomer and having a crystallinity from 10 to 40 percent as measured by density, as having high dimensional stability.

U.S. Pat. No. 4,022,748 discloses a polyester which is impact modified by a rubber elastic graft copolymer and is melt extruded at between 230–280° C. with improved impact properties.

U.S. Pat. No. 4,244,859 discloses a polyester which is impact modified by an acrylic rubber and is melt mixed with improved impact properties.

U.S. Pat. No. 4,525,529 discloses a polyester which is impact modified by an ethylene copolymer and an acrylic rubber which is melt kneaded at 250° C. with improved impact properties.

U.S. Pat. No. 4,564,658 discloses a polyester which is impact modified by a linear low density polyethylene and is melt extruded at between 230–300° C. with improved impact properties.

U.S. Pat. No. 4,948,842 discloses a polyester which is impact modified by a copolymer of ethylene, propylene, and diene rubber which is melted extruded at 230° C. with improved impact properties.

U.S. Pat. No. 4,977,217 discloses a polyester which is impact modified by a copolymer of ethylene, propylene, polyene grafted with an epoxide functional ester which is melt extruded at between 180–260° C. with improved impact properties.

U.S. Pat. No. 5,086,118 discloses a polyester which is impact modified by a copolymer of ethylene and which is melt extruded as having improved impact properties.

The conventional process for manufacturing polyester containers, herein referred to as a "glass-to-mold" process, has at least two heating steps; the first during production of the polyester source material by the supplier, and the second during shaping of the polyester into a container by the manufacturer. In the first step of the conventional process, the source polyester material is cooled as it is formed into pellets, rolls, sheets or other shapes suitable for shipping, storage and subsequent processing into articles of manufacture. In many processes, such as that for producing amorphous polyethylene terephthalate (A-PET), the cooling of the material from the molten state is at a sufficiently rapid rate so as to thermally quench most of the dynamic crystallization of the polymer and thus produce an undercrystallized material. In addition, thermal gradients may arise in the polyester during heating and cooling. The material stresses due to these thermal gradients then become frozen in the ambient temperature material. Such stresses due to thermal gradients are referred to herein as thermally induced stresses.

In the second step of conventionally producing articles made of polyesters, the pellets, sheets, etc. of polyester made in the first step are reheated until the material reaches a recrystallization onset temperature. At this point recrystallization of the material begins. Increased crystallinity is desirable in a product as it increases the melting temperature of the polyester so as to allow it to be used in a conventional oven for reconstitution.

Recrystallization upon reheating of a crystallizable polyester may be due to the further growth of existing crystals in the material or to the formation of new crystals, or both. The recrystallization onset temperature of a polyester may be easily detected by heating differential scanning calorimetry as that temperature at which the exothermic recrystallization reaction begins. The recrystallization onset temperature of a polyester material as determined in this way is localized to a temperature between the glass transition temperature and the melting temperature of the material and is dependent upon polymer chain length and composition, and the heating rate.

In the conventional thermoforming process, the heated polyester is then maintained at or near the recrystallization onset temperature until the desired degree of crystallinity is achieved, after which the material is molded and rapidly cooled. During glass-to-mold thermoshaping, additional undesirable thermal stresses may also be introduced into the polyester article at this cooling step.

As a result of the glass-to-mold manufacturing process, upon reheating of a conventional polyester article to the recrystallization onset temperature of the material, the undercrystallized material then again begins recrystallization. Such a situation presents a serious drawback to articles made by conventional processes, particularly those used as containers for the storage of foodstuffs and products that are meant to remain in sterilized state or are meant to be reheated to at or above the recrystallization onset temperature. Because of the recrystallization of the container on subsequent reheat, the additional shrinkage may result in not only product deformation, by also seal breakage or complete product failure as a container or barrier. Thus, a substantial number of previously sterilized items within a polyester container made by conventional processes must be discarded, resulting in a substantial amount of waste.

It is also known that amorphous phase polymer chains may be axially or bi-axially oriented by applying force, in either one or two directions, respectively, to the polymeric material while it is in a semi-fluid state, usually above the glass transition temperature (Tg) of the polymer. To achieve such a polymer chain orientation, a mechanical force is continuously applied as the polymeric material is cooled to below its glass transition temperature (Tg). It is known that such orientation of the polymers in a material decreases the gas permeability of the material as compared to a non-oriented polyester. For polyethylene terephthalate, such orientation reduces the oxygen permeability at 0% humidity from about 10 cc-mil/100 $in^2$-day-atm to 5 cc-mil/100 $in^2$-day-atm. However, chain orientation by this method results in mechanical stresses becoming frozen in the ambient temperature material. Heating of the oriented material to near or above the Tg results in the release of the physically induced stress contained therein, with the result that the material undergoes substantial dimensional distortion. Such distortion may also occur over long periods of time at ambient temperature. Thus, although the gas barrier properties of oriented materials make them particularly suitable for uses such as carbonated beverage containers, these same materials are wholly unsuitable for use where temperatures near or above the Tg of the material will be encountered. In particular, such oriented materials are unsuitable for use in retort, hot-fill and high temperature sterilization processes.

The thermally and physically induced stresses in a polyester result in a molecular imprinting of the past thermal history of the material, generally referred to as "memory". Such memory can only be completely removed from the material by reheating the polyester to above the melting temperature for a sufficient time to bring the material to a completely amorphous, molten state. Such high temperatures, however, are not used in the glass-to-mold thermoforming process. As a result, articles made in this way retain much of the stress introduced in this process of manufacture.

Thus, another drawback to articles made by the glass-to-mold process is that upon reheat some of the thermally and mechanically induced stresses frozen in the polyester are relieved, which may result in severe dimensional changes in the molded material. The greater degree of thermally and mechanically induced stresses imprinted in a article, the greater the potential for deformation therein upon reheating. As with the dimensional changes associated with recrystallization, distortions due to stress release can cause container seal failure and seam failure, with the resultant loss of sterility of the foodstuffs container therein. Such stress release may additionally cause undesired warping during retort, hot-fill and high temperature sterilization processes. As meant within this disclosure, the sum of the dimensional changes upon heating a polyester due to recrystallization and stress releases are referred to as the thermal dimensional stability of the polyester. Such a characterization of the thermal dimensional stability of a polyester may be conveniently expressed as the percent change in either linear, planar or volume dimensions, as appropriate, for a polyester article, that results from elevating the temperature of the article from about −60° C. to a temperature just below the onset of melting of the article. For example, the polyethylene terephthalate, this temperature range is from −60° C. to about 200° C.

An additional drawback to article of glass-to-mold manufacture is that since these polyesters retain a memory and may be undercrystallized, the use of scrap material derived in the manufacture of these articles is made less than highly desirable for inclusion in heat-based reclamation processes, as the stress memory and sub-optimal crystallinity will become incorporated in the recycled material, thereby conferring an undesirable thermal instability on the recycled article.

A further undesirable consequence of the glass-to-mold process of manufacturing a polyester article is the additional energy that must be expended to reheat the polymer prior to the shaping process. Such additional heating is both time consuming and energy-inefficient.

It is known that polyesters can be impact modified by the addition of rubber copolymers having low glass transition temperatures, U.S. Pat. No. 4,022,748. Most impact modifiers are added to the polyester and dispersed to give the impact properties desired. Factors affecting the impact strength of the polyester include particle size and distribution of the impact modifier, degree of mixing, and degree of melting of the impact modifier. The solubility of the impact modifier in the polyester affects the size and distribution of precipitates of impact modifier from the belt. Traditionally, the modifier was partially melt mixed into the polyester, and most of the attention was given to the dispersion of the particle size and distribution, and to the premixing of the initial impact modifier resins with no thought given to the control of melt precipitation in order to control the particle size and distribution of these impact modifier precipitates. Because of the generally rapid cooling of the impact modified polyesters in conventional processes, there is a low amount of uncontrolled precipitation of the dissolved impact modifiers from the melt. As a result, past inventors have been unable to achieved significant impact modification at the same costs as the improvements represented by the present invention.

In light of the above considerations, there clearly exists a need for an impact modified polyester that is dimensionally stable at both low and high temperature, that at the same time provides an improved gas barrier, and provides for improved impact strength at low temperatures. Preferably, such a product would be sterilizable by temperature, pressure, chemical and/or radiation methods. Still more preferably, such a polyester would be compatible with use for containing foodstuffs, beverages, and the like, and would be both microwavable and ovenable at high temperatures. It would additionally be advantageous for such a product to be recyclable, so as to both decrease the cost of manufacture and provide a product that is environmentally sound.

SUMMARY OF THE INVENTION

The present invention provides for polyesters with improved impact properties, low oxygen permeability and low dimensional shrinkage during heating. Impact modifiers are dissolved into a molten polyester to form a eutectic alloy. The eutectic alloy of this composition freezes on slow cooling to form a mixture of particles of the impact modifier embedded in a matrix of the polyester. This therefore is the formation of a natural composite. By controlling the solidification of the melt, the size and distribution of precipitates of impact modifier from the melt can be controlled, which allows control of the mechanical properties of the composition. If, however, the liquid composition is thermally quenched, little or no precipitation will occur leaving a material without the composite characteristics of the composition. The precipitation can also be controlled either by homogenous nucleation or by heterogeneous nucleation with the addition of a nucleating agent or the introduction of a suitable surface for nucleation.

The moldable thermoplastic impact modified polyester of the invention has intrinsic viscosity from about 0.65 to about 1.3 and provides a gas barrier characterized by an oxygen permeability of from about 0.2 to about 4.9 cc-mil/100 in $in^2$-24 hrs-atm at 23° C. and at 60% relative humidity outside/100% relative humidity inside, while also having an enthalpy of recrystallization upon heating of from about 0 to about −4.0 calories per gram as determined by heating differential scanning calorimetry, as well as a linear dimensional shrinkage of from about 0% to about 6% upon heating from about −60° C. to about 200° C.

The invention also provides for an impact modified polyethylene terephthalate composition made by the method of the invention. This composition comprises:

(A) from about 70 to about 99% by weight of a polyethylene terephthalate which functions as the base polymer;

(B) from about 1 to about 30% by weight of an impact modifier from the group consisting of ethylene-methylacrylate, ethylene-butylacrylate, ethylene-ethylacrylate, ethylene-vinyl acetate, ethylene-maleic acid, polypropylene, isopropylene, polybutadiene, polymethyl methacrylate-polycarbonate shell core modifier and paramethylstyrene which functions to increase the cold impact strength of the polyethylene; and (C) from about 0 to about 29% by weight of a compatibilizer which functions to improve the surface properties between the polyethylene terephthalate and the impact modifier, and which provides an impact modified polyester that has an oxygen permeability of from about 0.2 to about 4.9 cc-mil/100 $in^2$-24 hr-atm at 23° C. and 60% relative humidity outside/100% relative humidity inside without axial orientation.

The invention provides further for a shaped article of manufacture comprising the above impact modified polyester.

The invention provides further for a drawing thermoforming process for producing a shaped impact modified polyester article with improved low temperature impact strength comprising the steps:

(a) heating a composition comprising a crystallizable polyester and an impact modifier to a temperature above the melting point of the polyester to obtain a completely or substantially completely amorphous state of the polyester;

(b) maintaining the composition heated in step (a) at a temperature above the melting point of the polyester for a time sufficient to substantially eliminate previous molecular stress imprinting and until an effective amount of the impact modifier has dissolved in the polyester; and (c) controlled cooling of the composition in step (b) at a rate of from about 1° C. to about 89° C. per minute until there is crystallization of the polyester and impact modifier forming a mixture of particles of impact modifier embedded in a matrix of the polyester, the precipitate of the impact modifier having particle size distribution wherein the mean diameter of the impact modifier precipitate is from about 0.1 to about 10 microns, and (d) continuing controlled cooling of the composition by contacting the composition to a surface capable of imparting shape, said contact surface being at a temperature of at least the lower boundary crystallization from melt temperature of said polyester for from about 1 second to about 5 minutes; to provide an impact modified polyester with an oxygen permeability of from about 0.2 to about 4.9 cc-mil/100 $in^2$-24 hr-atm at 23°

C. and 60% relative humidity outside/100% relative humidity inside without an axial orientation step and a heat of recrystallization of from about 0 to about −4.0 calories per gram as measured by differential scanning calorimetry at a heating rate of about 25° C./minute.

DETAILED DESCRIPTION OF THE INVENTION

Figure 1:
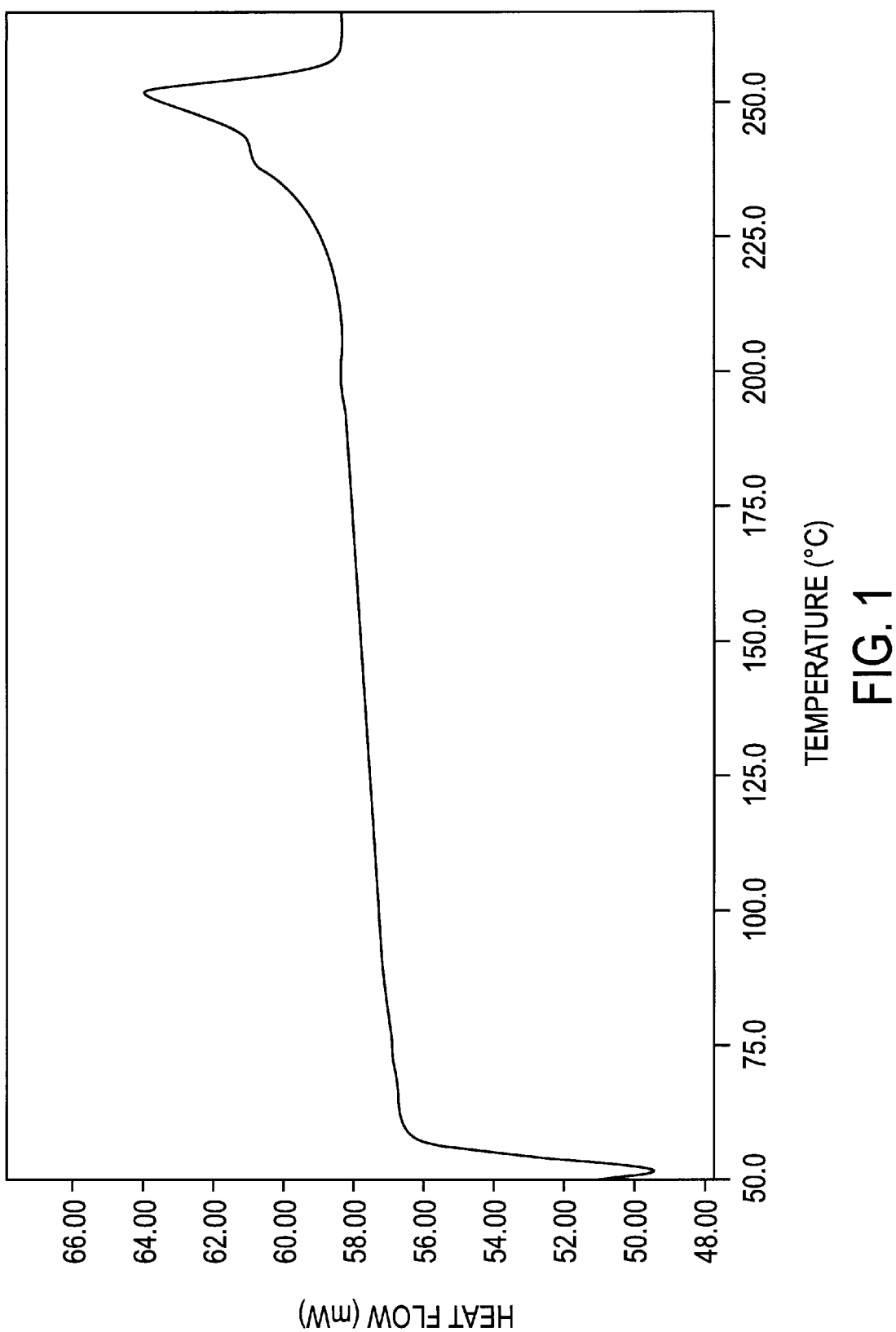
FIG. 1 depicts a differential scanning calorimetry thermogram of a polyester composition made from the present melt-to-mold process as described in Example 1.

Crystallizable polyesters as meant herein are those polyester homopolymers, heteropolymers and blends in which at least 10% of the final material is capable of existing in a crystalline state at ambient temperature. Examples of such crystallizable polyester homopolymers include the alkylene terephthalate and naphthalate homopolymers such as, for example, polyethylene terephthalate (PET), polypropylene terephthalate, polybutylene terephthalate (PBT), polymethylpentene terephthalate, polycyclohexenedimethlyene terephthalate, polyethylene naphthalate (PEN), polypropylene naphthalate, polybutylene naphthalate, as well as polyterephthalic acid (PTA), polycycloterephthatlic acid (PCTA), and cyclohexanedimethanol (CHDM). Modified polyesters, particularly glycol modified polyesters of, for example, PET, PBT, PEN and PCTA are also known to be crystallizable. Furthermore, certain copolymers of the above compounds are also crystallizable polyesters, as are blends of these homopolymers, blends of copolymers and blends of heteropolymers.

The product of the invention is thought to achieve its desirable impact properties through controlled precipitation of the impact modifiers. This can be accomplished by the combination of several factors including the use of controlled cooling, nucleating agents, and the proper selection of impact modifiers for a given polyester. The product can further achieve homogeneity, gas permeation, recrystallization, dimensional stability and greater control of impact modifier precipitation at elevated temperatures due to a novel process of manufacture, herein referred to as a "melt-to-mold" process. Without being limited by theory, it is believed that these superior properties of homogeneity, gas permeation, recrystallization and dimensional stability are related to both the fact that the polyester starting material is in a completely or substantially completely amorphous, molten state, thereby having little, if any memory at the outset, and that the cooling rate from melt and time at temperatures conductive to crystallization is controlled. By "substantially completely amorphous" it is meant that the amount of polyester that is not melted to a completely amorphous molten state is not great enough to yield a material that exceeds the gas permeability, dimensional stability and enthalpy or recrystallization (as determined by heating DSC) that characterize the material of the invention. Thus, it is envisioned that small amounts (e.g., less than 1 weight percent) of non-molten material will not substantially affect the permeability and recrystallization characteristics of the impact modified polyester or article of manufacture of the invention.

The controlled cooling of the molten material in making the product of the invention provides for at least three advantages. First, the product of the invention contains highly developed crystals at, or close to a level of crystallinity that the material naturally seeks under the most favorable conditions for crystal formation. By highly developed crystals, it is meant that the crystals in the material are larger in size, more spherical in shape and are more evenly distributed throughout the material than was heretofore attainable in conventional manufacturing processes. It is thought that these highly developed crystals serve to impede gas flow through the material. Such a high degree of crystal growth also eliminates the need for axial orientation of the polymer for this gas barrier purpose. As a result, the product of the invention does not have mechanical stresses embedded therein that are traditionally associated with polyester of low gas permeability.

A second advantage of the invention is that the controlled cooling in the melt-to-mold process described herein aids in the manufacture of an impact modified polyester or impact modified polyester article in which thermal gradients are minimized. As a result, the product of the invention additionally has a lower degree of thermal stress memory than many previously available products. The low degree of stresses and highly developed crystals result in a product with improved dimensional stability at elevated temperatures which at the same time provides an efficient gas barrier.

A third advantage of the invention is that controlled cooling in the melt-to-mold process described herein aids in the manufacture of a impact modified polyester in which the precipitation of impact modifier is controlled. As a result, the product of the invention additionally has increased impact strength at lower temperatures where polyesters tend to mechanically function in a brittle manner while retaining its superior gas permeation and dimensional stability characteristics.

What follows for a more complete understanding of the invention is a brief discussion of the theoretical aspects of controlled precipitation of impact modifiers and polyester crystal formation that are thought to explain the uniqueness of the product and controlled cooling process of the invention. Nevertheless the invention is not intended to be limited by this theoretical explanation.

The precipitation of impact modifiers which dissolve into a polyester is thought to form a eutectic alloy. As used herein, a eutectic alloy is a liquid of a fixed composition which freezes to form a mixture of two basically different solids or phases. A homogeneous liquid of this composition on slow cooling freezes to form a mixture of particles of the one compound embedded in a matrix of the other. This therefore is the formation of a natural composite. By controlling the solidification of the melt, the size and distribution of the impact modifier precipitates from the melt can be controlled, which allows control of the mechanical properties. If, however, the liquid composition is thermally quenched, little or not precipitation will occur leaving a material presumably without the composite affects of the precipitated compound. The precipitation can also be controlled either by homogenous nucleation or by heterogeneous nucleation with the addition of a nucleating agent or the introduction of a suitable surface for nucleation.

Crystallizable polymers generally exist at ambient temperature as a mixture of amorphous, crystalline and boundary phases. In the amorphous phase, the polymer chains are generally without large scale order with respect to one another. In the crystalline phase the polymer chains are highly ordered, and in the boundary phase between the crystal and amorphous phases, the polymer chains are intermediate in order as compared to the other two phases. The percentage of a crystallizable polymer material that is in each of the above-mentioned three phases is dependent on the thermal history of the material.

At sufficiently high temperature (i.e., hereinafter referred to as the "melting temperature") or above, and after sufficient time if the polyester has had a previous thermal history, polyesters achieve a completely amorphous or substantially completely amorphous, molten state. The melting temperature of a polyester is most accurately determined by DSC, as the temperature at which the endothermic melting of the polyester is achieved. For example, for a typical polyethylene terephthalate, this temperature is about 250° C. Polyesters which have not been previously cooled below the melting temperature, and thus have no thermal or mechanical history embedded therein also exist in the amorphous state.

Generally, as the temperature of an amorphous crystallizable polyester is lowered, an upper crystallization onset temperature from melt is reached, at which point the polymer chains begin to order and crystallization of the material begins. The "upper crystallization onset temperature from melt" as used herein is the temperature, at atmospheric pressure, wherein the exothermic dynamic crystallization reaction in a cooling crystallizable polymer melt begins, as determined by the beginning of the exothermic dynamic crystallization reaction measured by cooling differential scanning calorimetry. For molten PET, the upper crystallization onset temperature is between from about 170° C. to about 210° C. at a cooling rate of about 20° C./min. As used herein, the "dynamic crystallization reaction" and "dynamic crystallization" refers to the afore-mentioned crystallization of a polyester upon cooling to ambient temperature forming the melt temperature or above.

As the crystallizable polymer continues to cool, a lower boundary crystallization temperature from melt is reached, where at the dynamic crystallization from melt ceases. The "lower boundary crystallization temperature from melt" is that temperature at which the exothermic dynamic crystallization reaction ceases, again as determined by cooling differential scanning calorimetry. For PET, the lower boundary crystallization temperature is from about 180° C. to about 150° C., at a cooling rate of about 20° C./min. Thus the temperature window in which a polymer cooling from the melt temperature is able to crystallize is localized to that temperature range between the upper crystallization onset temperature from melt on the high temperature end to the lower boundary crystallization temperature from melt on the lower temperature end.

In the temperature range between the upper crystallization onset temperature from melt and the lower boundary crystallization temperature from melt, there exists a temperature at which the rate of crystallization of the polymer is at a maximum. This temperature is referred to herein as the "peak crystallization rate temperature from melt", also sometimes referred to as the maximum crystallization rate temperature. The peak crystallization temperature from melt is that temperature in a cooling differential scanning calorimetry analysis where the heat flow of the dynamic crystallization reaction is at a minimum. For PET, the peak crystallization rate temperature from melt is generally from about 160° C. to about 200° C., at a cooling rate of about 20° C./min. As is also the case for the upper and lower temperature boundaries at which crystallization from melt can occur, the peak crystallization rate temperature from melt is dependent upon the specific polymer, particularly with respect to the chain length and chain substituents. Additionally, each of these temperatures is dependent upon the rate of cooling of the polyester, with faster cooling rates tending to decrease each of these characteristic dynamic crystallization temperatures. For example, at cooling rates greater than about 90° C./min, the peak rate of crystallization from melt is suppressed and thus the amount of crystallization is the resultant ambient temperature material is lower than that which is attainable with a lower cooling rate. Such a suppression of crystallization is referred to as "thermal quenching" of crystallization.

Although each of the characteristic temperatures associated with dynamic crystallization is variable, each of these temperatures for a given polymer or copolymer may easily ascertained by one skilled in the art, using DSC analysis.

While the polymer is maintained within the temperature window defined by the upper crystallization onset temperature from melt and lower boundary crystallization temperature from melt, crystallization of a polymer continues until all material that will naturally undergo crystallization exists in the crystalline state. Alternatively, if the polymeric material is continually cooled, while the polymer is in the above-defined temperature window conductive to crystallization, it crystallizes to the maximum extent possible for the given rate of cooling and the given polymer.

Thus, in contrast to the glass-to-mold process wherein crystallinity is controlled through the recrystallization reaction, control of crystallinity in the product and process of the present invention is achieved through control of the length of time the polymer is within the above-defined temperature window at which dynamic crystallization occurs and the temperature at which the crystallization reaction is performed. For example, if the peak crystallization rate temperature is used, a minimum amount of time is required for the crystallization reaction to complete. Suboptimal crystallization temperatures require a longer time at temperature for the completion of the dynamic crystallization reaction.

What is considered most important in the practice of the invention is that the time at temperature within the aforementioned window of dynamic crystallization, be sufficiently long that the material has a controlled precipitation of an impact modifier to maximize impact properties while achieving a state of crystallization to which the polyester naturally strives, such that upon reheat, there is little, if any, recrystallization as determined by heating DSC analysis or expressed as the enthalpy of recrystallization, $\Delta Hr$.

Crystallinity as defined herein is measured by differential scanning calorimetry, for example with a Perkin Elmer-brand "7 Series" Thermal Analysis System, as opposed to the viscosity measurement method that has been commonly used previously by others. It is emphasized that the two techniques for determination of the crystalline content of a polyester are not directly related such that values calculated by one technique can be converted to a value corresponding to that derived from the other technique. This is because the density measurement of crystallinity is dependent upon additives to a polyester composition. Calculations based on such a density measurement will, therefore, not always adequately represent the true crystallinity of a material.

By contrast, through use of differential scanning calorimetry, the behavior of the polyester can be isolated from that of any additives, and thus the degree of crystallinity directly calculated from the DSC thermogram as is known in the art.

One aspect of the invention provides for a crystallizable impact modified polyester that provides an improved gas barrier, has little or no tendency to recrystallize on heating and has improved dimensional stability upon heating to temperatures up to about 200° C.

Polyesters suitable as starting material for making a impact modified polyester with the improved gas permeability, degree of crystallization and dimensional stability of the material of the invention are commercially available. For example, polyethylene terephthalate is available from Eastman Kodak Chemicals as product number 9902 and from Goodyear Tire and Rubber as product number 9506. However, as discussed below, these materials must be heated to above their melting temperature for sufficient time to render them into a completely or substantially completely amorphous, molten state.

Due to the desirability of the absence of a process step which requires reheating a commercially available polyester to the molten state, ti is preferred that the impact modified polyester of the invention be made from the molten product of the polyester formation reaction. Thus, the polyester product of the invention may be made from precursor materials as known in the art. These precursors are generally saturated diols (or other polyols) and unsaturated dibasic acids or their anhydrides.

Suitable diols include for example, ethylene glycol; propylene glycol; diethylene glycol; and 2,2-dimethyl-1,3-propanediol; 1,4 butane diol; 1,4 cyclohexane dimethanol; 2,2,4-trimethyl-1,3-pentane diol; 2-methyl-2-propyl-1,3-propane diol; 1,3 butane diol; 1,5 pentane diol; 1,6-hexane diol; 1,8-ocatane diol; 1,9-nonane diol; 1,10-decane diol; 1,12-dodecane diol; 1,2-cyclohexanedimethanol; 1,3-cyclohexanedimethanol; 2,2,4,4-tetramethyl-1,3-cyclobutane diol; 1,2-xylene diol; 1,3-xylene diol; and 1,4-xylene diol. Diols for preparing the product of the invention may generally comprise from about 5 parts to about 95 parts of the final polyesters. The preferred diols are ethylene glycol, propylene glycol and 1,4-butane diol, with the most preferred being ethylene glycol.

Suitable dibasic acids or acid anhydrides include maleic acid, fumaric acid, terephthalic acid (1,4-benzenedicarboxylic acid), 2-chloroterephthalic acid; phthalic acid (1,2-benzenedicarboxylic acid) and isophthalic acid (1,3-benzenedicarboxylic acid); 2,6-naphthalene dicarboxylic acid; 2,7-naphthalene dicarboxylic acid; and 4,4'-biphenyl dicarboxylic acid or combinations thereof. Dibasic acid for preparing the product of the invention may comprise from about 95 parts to 5 parts, by weight, of the final polyester. Preferred dibasic acids in the practice of the invention are terephthalic acid and naphthalic acid, with terephthalic acid being most preferred.

Derivatives of these diols and dibasic acids may also be used as starting material for producing the product of the invention. With respect to diols, reference is specially made to their $C_{(1-6)}$ substituted derivatives, while with respect to dibasic acids, reference is specifically made to monoalkyl- and dialkyl esters of terephthalic acid, such as the 1-methylester and 1,4-dimethylesters of terephthalic acid.

The polyol and dibasic acid starting materials may be reacted either through the direct esterification process (when using the free acid as starting material) or the ester-interchange process (for example, when starting with the methylester derivative of terephthalic acid). The polyesters thereby generated are then exposed to high temperature (e.g., from at least about 240° C., preferably about 280° C.) at which point melt polymerization of the material proceeds. The degree of polymerization can be determined through use of torque meters connected to stirrers that are in contact with the polymer melt. As the polymer chain length increases, the viscosity of the melt increases. The reaction is then stopped when the viscosity reaches the desired value as indicated below.

Although it is preferred that the process of the invention begin with the molten product of the polyester formation reaction, it should be recognized that any molten, amorphous or substantially amorphous polyester, is suitable as a starting material.

The polyester polymer of the present invention may comprise either a homopolymer or copolymer, so long as the material is capable of achieving a crystallinity of at least 10% as measured by cooling DSC and as exemplifed below. The polyester of the invention may also be a blend of homopolymers, copolymers or heteropolymers as long as the requisite degree of crystallinity is met.

The preferred homopolymers in the practice of the invention are those of polyethylene terephthalate, polybutylene terephthalate and polyethylene naphthalate. The most preferred homopolymer is polyethylene terephthalate. Suitable polymers are derived, for example, from about $C_{(1-6)}$, non-soluble and partially miscible olefins, such as propylene, butylene, ethylene methyl acrylate, ethylene butyl acrylate, methyl butyl styrene, polyethyl adipate, epichlorohydrin, maleic acid, and fumaric acid.

Conventional catalysts may also be employed in making the polyester of the invention. Such catalysts, which include transition metal compounds such as antimony acetate, antimony trioxide, titanium alkoxides, stannous alkoxides, and the like, may be used at conventional concentrations.

The impact modified polyester of the present invention may have an intrinsic viscosity of from about 0.6 to about 1.3 as measured at 25° C. in a 60:40 by weight mixture of phenol:tetrachloroethane at a concentration of about 0.5 g/100 ml. Preferably, the impact modified polyester of the invention has an intrinsic viscosity of from about 0.6 to about 1.0, and most preferably the intrinsic viscosity of the impact modified polyester of the invention is from about 0.6 to about 0.95, measured as described above.

The polyester may constitute from about 70 to about 99% by weight of the total composition, preferably from about 73 to about 98% by weight of the total composition, and most preferably from about 85 to about 98% by weight of the total composition. The preferred polyester is polyethylene terephthalate.

The present invention relies in part on the control of the precipitation of the impact modifiers from the base polyester. This is critical because the size and distribution of the precipitated impact modifier has a significant effect on the mechanical properties of the impact modified polyester composition, and on the impact properties in particular. These materials are useful in decreasing the tendency of crystallized polyesters to shatter, particularly at below ambient temperature, for example to a temperature of about −60° C. These materials are also useful in decreasing the variation in impact strength in polyesters at higher temperatures. Impact modifiers are thus most useful in the production of containers for items that are meant to be refrigerated or frozen, but are also desirable in higher temperature applications.

Two advantages are seen with the present invention over the traditional impact modified polyesters. First, because of the rapid cooling rate used in producing traditional impact modified polyesters, much of the impact modifier that dissolved into the polyester never precipitates upon cooling. This created the need for employing a relatively large quantity of impact modifier to achieve acceptable results even when given a similar dispersion of impact modifier particles in the polyester as initially present in the composition of the invention. Since the impact modifiers generally sold today represent a considerable expense in producing a product, efficiency in use of the impact modifier represents a significant production cost savings.

Second, the present invention provides for improved impact properties over traditional dispersion methods by the controlled precipitation of the impact modifiers from the melt, which provides for improved uniformity of the impact modifier precipitate, which then results in improved impact resistance. Of the many factors that can be used to control size and distribution of the melt precipitates, the cooling rate of the composition is thought to be the most important since it allows for the most efficient use of impact modifier, and uniformity of the particle size and distribution is better controlled.

Most known impact modifiers are suitable for use in practicing the invention. Examples of these impact modifiers include polycarbonates, glycol-modified PET, polyarylates, polybutene, polybutylene, methyl butyl styrene, polybutene-polyethylene copolymer, polysulfones, polymethylmethacrylate, polyisobutylene, polyisobutylene-polyethylene copolymer, polymethylmethacrylate-polycarbonate shell-core modifier, polyethylene-methyl acrylate copolymer, polyethylene-butylacrylate copolymer, polyethylene-ethylacrylate copolymer, polyethylene vinyl acetate copolymer, polyethylene-maleic acid copolymer, polypropylene, polyisopropylene, polybutadiene or combinations of these polymers in copolymer or blended form and the like as is known in the art. The preferred impact modifiers are ethylene-methylacrylate copolymers and ethylene-butylacrylate copolymers.

By "particle size and distribution" as used herein, it is meant the average particle diameter of all the impact modifier precipitate particles in the composition, and the standard deviation of all of the particles from this average particle diameter. The useful particle size and distribution of the impact modifier precipitate after the cooling cycle for the present invention is from about 0.1 to about 10 microns with a standard deviation from about 0.1 to about 4 microns, preferably from about 0.1 to about 5 microns with a standard deviation from about 0.1 to about 2 microns, and most preferably from about 0.1 to about 2 microns with a standard deviation from about 0.1 to about 1 microns.

The impact modifier may create a polyester supersaturated solution. The desired amount of impact modifier which is dissolved into the polyester is dependent on that which is required to give the particle size and distribution necessary for the improve impact properties. It should be remembered that in the present invention not all of the impact modifier is required to be dissolved in the polyester in order to achieve optimal impact properties; rather it is the amount of, and particle size and distribution that is important. The amount of dissolved impact modifier is generally from about 0.1% to about 30% by weight as compared to the total weight of the composition, preferably from about 1.0% to about 25% by weight, and most preferably from about 2.0% to about 15% by weight, as compared to the total weight of the composition.

When desired, impact modifiers are useful in the composition of the invention at from about 1% to about 30% by weight as compared to the total weight of the composition, preferably from about 2.0% to about 27% by weight, and most preferably from about 2.0% to about 15% by weight, as compared to the total weight of the composition.

The composition may also include a compatibilizer. A compatibilizer is a compound which promotes the surface attraction and bonding between the polyester and the impact modifier. The amount of compatibilizer is generally from about 0% to about 29% by weight as compared to the total weight of the composition, preferably from about 0% to about 25% by weight, and most preferably from about 0% to about 13% by weight, as compared to the total weight of the composition. Examples of compounds which can be used as compatibilizers include polycarbonate, acetal, aromatic polyketone, acrylonitrile, polyamide-imide, polyarylate, polyetherimide, polyamide, polyphenylene oxide, polyphenylene sulfide, polyimide, polyarylsulfone, polysulfone, polyurethanes, epoxy resins, and modified polyester resins.

The impact modified polyester of the invention may also be employed in a composition to improve the gas barrier and thermal dimensional stability of articles made from the composition. Other ingredients in such a composition include nucleants, heat stabilizers, mold release agents, and trimming agents. It should be understood that the additives are not required in order to produce the improved crystallinity, gas permeability, thermal dimensional stability and improved impact characteristics of the product of the invention.

When desired, a composition comprising the impact modified polyester of the invention may include nucleants. These materials may aid in increasing the number of polyesters crystals and in the precipitation of the impact modifier, as well as rate of crystal & precipitate formation in the composition of the invention. Examples of suitable nucleants include inorganic heterogeneous nucleants, such as silica, talc, calcium carbonate, gypsum, carbon black, titanium dioxide, mica, powdered glass, finely divided metals, metallic salts such as sodium benzoate, ionomers such as the ethylene ionomer, graphite, glass fiber, carbon fiber, ceramic fiber, metal fiber, inorganic as well as others as known in the art.

Homogeneous organic nucleants may also be incorporated in the composition of the invention. For example, when the polyester is the preferred polyethylene terephthalate, finely divided particles made of low molecular weight (i.e., $M_w$ below about 6500–8500) PET may serve as nucleant. Similarly, with a polybutylene terephthalate base polymer, low molecular weight PBT may be incorporated in the composition to serve as nucleant. The preferred homogeneous organic nucleants are these low molecular weight PET and PBT for their respective base polyesters.

Nucleants may also be of the heterogeneous organic type. For example, low molecular weight polyethylene naphthalate ($M_w$ less than about 6500–8500) may be used as nucleant for a polyethylene terephthalate base polymer, or polyethylene terephthalate may be used as nucleant for a polybutylene terephthalate base polymer, and so on. When desired in the practice of the invention, the preferred heterogeneous organic nucleants for use in a composition of the preferred polyethylene terephthalate homopolymer, is methyl butyl styrene, and the $C_{1-6}$ polymers, such as ethylene-propylene copolymer, ethylene-butylene copolymer, ethylene-pentene copolymer, and polymethylpentene (TPX®, Phillips 66). Tenite® polyethylene E3031-61AA (Eastman Chemical Products, Inc., Kingsport, Tenn.) may also be used in the invention.

When included in the composition of the invention, nucleants may be added between from about 0% to about 5% by weight as compared to the total weight of the composition. Preferably, nucleants are used in from about 0% to about 3% by weight, and most preferably from about 0% to about 2.8%, as compared to the total weight of the composition. Nucleants are also generally preferred to have an average particle size from about 0.05 to about 10 microns in diameter.

Heat stabilizers may also be included in the product of the invention. This additive is useful for inhibiting oxidation of the base polyester at elevated temperature and thus is desirable for inclusion in compositions which are designed to be heated, such as ovenable food trays. The use of heat stabilizers is described, for example, in U.S. Pat. Nos. 3,987,004; 3,904,578; and 3,664,482. Suitable heat stabilizers useful in the product of the invention include alkylated substituted phenols, bisphenols, substituted bisphenols, thiobisphenols, polyphenols, polybisacrylates, aromatic amines, organic phosphites and polyphosphites. Of the aromatic amines, reference is made to primary polyamines, diarylamines, bisdiarylamines, alkylated diarylamines, ketone-diarylamine condensation products, aldehyde-diarylamine condensation products and aldehyde imines. Specific reference in regard to polyphenols useful as a heat stabilizer in the product of the invention is made to tetrakis (methylene-(3,5-ditertiarylbutyl-4-hydroxyphenyl)-proprionate)methane and 1,3,5-trimethyl-2,4,6-tris(3,5-ditertiarybutyl-4-hydroxybenzyl)benzene. Commercially available heat stabilizers such as Ethanox 330® (Ethyl Corporation) and Ergonox 1010® (Ethyl Corporation) may also be suitably employed in the product of the invention. The preferred heat stabilizer is Ergonox 1010®.

When added to the composition of the invention, heat stabilizers are useful from about 0% to about 0.04% by weight as compared to the total weight of the composition. These materials are preferably included to between from about 0% to about 0.035% by weight, and most preferably to between from about 0% to about 0.03% by weight, as compared to the total weight of the composition.

Mold release agents may also be included in the composition of the invention. These materials aid in the removal of a shaped article from the shaping surface. Suitable mold release agents include $C_{1-6}$ olefins (copolymer or homopolymer versions), low molecular weight polymers such as polyethylene, and low molecular weight waxes such as Aclyn® (Allied Signal Co.). These mold release agents are preferable for inclusion in the composition of the invention as they additionally serve as trimming agents which facilitate the trimming of excess material from a shaped article of the invention. Zinc stearate is also known as a useful mold release agent.

Mold release agents are suitably included in the composition of the invention as is usual in the art, generally at from about 0% to about 3.0% by weight, as compared to total weight of the composition.

Colorants may also be added to the composition of the invention. In addition to potential nucleating agents carbon black and titanium dioxide, reference is also made to non-nucleating colorants such as phthalocyanine blue, solvent red 135, and disperse yellow 64. To determine if a particular colorant is also a nucleating agent, comparison is made of DSC thermograms as to the crystallization onset temperature from melt, peak crystallization rate temperature from melt and total enthalpy of crystallization of the polyester with and without the colorant. These values are essentially unchanged by the presence of a non-nucleating colorant. The amount of colorant required for a particular color is easily determined by those in the art.

As is evident from the foregoing, in some cases an additive to the composition of the invention performs more than one function in the final product. For example, low molecular weight olefins may act as an impact modifier, a mold release agent, a trimming agent, or a carrier for colorants, stabilizers, and the like. As another example, carbon black may act as both a pigment and a nucleant. Impact modifiers may also act as nucleants, mold releases, trimming agents in the present process. Thus, depending upon the final end use of the composition of the invention, different additives will be preferred as is known in the art.

The polyester product of the invention is defined first in that the degree of crystallinity is between from about 10% to about 50%, preferably from about 12% to about 45%, and most preferably from about 15% to about 40% each as determined by differential scanning calorimetry.

The product of the invention is also characterized by improved thermal dimensional stability, in that upon heating from about −60° C. to about 200° C., there is less than about 6% shrinkage in any linear dimension, preferably less than about 5%, and most preferably less than 3% in any linear dimension.

The product of the invention further provides for a gas barrier as characterized by an oxygen permeability of from about 0.2 to about 4.9 cc-mil/100 in$^2$-24 hr-atm, at 23° C. and at 60% relative humidity outside/100% relative humidity inside. Preferably, the oxygen permeability is from about 0.2 to about 4 cc-mil/100 in$^2$-24 hr-atm at 23° C., more preferably from about 0.2 to 3. Even more preferably from about 0.2 to 2 cc-mil/100 in$^2$-24 hr-atm at 23° C. Yet more preferably from about 0.2 to about 1.5 cc-mil/100 in$^2$-24 hr-atm at 23° C. Most preferably the oxygen permeability is from about 0.2 to 1.0 cc-mil/100 in$^2$-24 hr-atm at 23° C. Each of the above permeabilities being at 60% relative humidity outside/100% relative humidity inside.

The product of the invention is still further characterized by an enthalpy of recrystallization, ΔHr, between about 100° C. and 170° C., as determined by heating differential scanning calorimetry, of from about 0 to about −4.0 cal/g at a heating rate of about 20° C./min. The product may also have an enthalpy of recrystallization of from about 0 to about –3.0 cal/g, preferably from about 0 to about –2.5 cal/g, more preferably from about 0 to about –1.0 cal/g, and most preferably about 0 cal/g, as determined by heating DSC in the temperature range of from about 100° C. to about 170° C. and at a heating rate of about 20° C./min.

In making the product of the invention from previously synthesized polyester, the base polyester is first heated at about 350° F. for greater than about 6 hours in a desiccating oven in order to lower the moisture content of the material to less than about 110 ppm, preferably to less than about 50 ppm. Other additives, such as a polyethylene mold release agent may also require heating to lower the moisture content as is known in the art.

Next, the polyester base material and any desired additives are mixed together, preferably in a mixing screw of an extruder, and heated to at or above the melting temperature of the polymer for a time sufficient to provide for a completely amorphous or substantially completely amorphous molten polyester. In the case of the preferred impact modified polyethylene terephthalate, the temperature is preferably brought to between from about 450° F. to about 610° F., most preferably from about 480° F. to about 580° F. Particularly if the polyester source material has a prior thermal history, it is important that the composition be kept at this higher temperature for a sufficient time to achieve the desired molten state. The particular length of time will vary according to the precise polyester of the composition as well as to the amount, if any, of material that has had a previous thermal history.

If oxygen permeability is not a major consideration, the impact modified polyester can be processed by any process which results in the control of the precipitation of impact modifiers in the size and distribution listed above. If, however, lower oxygen permeability is desired then, in contrast to conventional processes for producing impact modified polyesters and articles made of this material, after formation of an amorphous or substantially amorphous molten polyester of correct viscosity, the polyester material is contacted to a surface capable of imparting a shape on the composition, such as a laminating table, or a surface of a mold cavity. The impact modified polyester material may be contacted with the surface by any of the known techniques, such as extrusion molding.

U.S. Pat. No. 4,061,706 and U.S. application Ser. No. 07/165,370, now U.S. Pat. No. 5,106,567, both describe an apparatus suitable for imparting shape on the impact modified polyester of the invention so as to make a thermoformed article. However, any material capable of withstanding the temperatures used in the process of the invention without substantial distortion may be used as the surface capable of imparting shape on the impact modified polyester or composition of the invention. Additionally, the material of which the surface is made must not chemically react with the impact modified polyester or any components of the composition of the invention. The preferred surface is made of metals or metal alloys, as these materials are reusable and thus highly economical, relatively chemically inert with respect to the components of the composition of the invention, provide high rates of heat transfer, readily controllable temperature, and a uniform temperature throughout. The preferred material for the shaping surface in the process of the invention is aluminum.

The temperature of the surface in the process of the invention is within the range of temperature wherein crystallization occurs in the cooling impact modified polyesters (i.e., from between at or above the lower crystallization onset temperature to at the higher crystallization onset temperature). Preferably, the surface to which the impact modified polyester is applied is at or near the peak crystallization rate temperature for the polyester material, and most preferably, the temperature of the surface is at the peak crystallization rate temperature. The material is then kept at this temperature for a time sufficient to induce a material with the desired impact strength dimensional stability, gas permeability and low enthalpy of recrystallization.

It emphasized that to produce the product of the invention, the time at temperature also determines the degree of crystallinity in the final polymer product. Thus, at temperatures below the peak crystallization rate temperature, longer residence times of the polymer on the surface would be required in the process of the invention, than would be were the material at the peak crystallization rate temperature. Thus, when speed of production is desired in making the product of the invention, it is most preferred that the impact modified polyester material is contacted with a surface at the peak crystallization rate temperature. However, if longer residence times are permitted, virtually the same material can be produced at non-optimal crystallization rate temperatures (i.e., elsewhere within the temperature window within which dynamic crystallization can occur). It should be generally understood that the longer the time the impact modified polyester is in the window wherein dynamic crystallization can occur, the better. This is because long residence times at the correct temperature ensures that the material has reached the level of crystallinity it naturally tends to and thus minimizes any recrystallization upon heating. In the process of the invention using the preferred polyethylene terephthalate homopolymer, the time of contact between the impact modified polyester or composition may be from about 1 second to about 5 minutes, between 2 seconds and about 4 minutes, between 3 seconds and about 3 minutes, between about 4 seconds and about 2 minutes, preferably between about 6 seconds and about 1.9 minute, and most preferably between about 8 seconds and about 114 seconds.

Next in the process of the invention, the impact modified polyester material contacted to the surface is cooled at a rate of from between about 1° C. to about 89° C. per minute, preferably from between about 5° C. and 80° C. per minute and most preferably between from about 20° C. and about 80° C. per minute. The rate of cooling of the product of the invention is deemed important in that what is meant to be avoided is the thermal quenching of the crystallization process. Thus the melt-to-mold process of the present invention is directly the opposite of the conventional glass-to-mold thermoforming processes, in that in the latter, thermal quenching of crystallization is desired. After sufficient cooling of the impact modified polyester, preferably to below the lower boundary crystallization temperature from melt, and most preferably below the Tg of the impact modified polyester, the product of the invention may then be removed from contact with the heated surface and cooled to ambient temperature. This final cooling to ambient temperature is most conveniently achieved by radiative cooling in air.

In other applications of the invention, the cooling process may be desired to be at different rates for different parts of the impact modified polyester or composition. In this way, different regions of the shaped article of the invention may have different degrees of crystallinity, with the resulting differences in properties, such as impact resistance. Thus, for example, a bottle made of the impact modified polyester or composition of the invention may have a higher crystallinity and resistance to thermal deformation at the part comprising the mouth of the bottle, than does the body of the bottle. Such an application may be preferable, for example, in an automated hot-fill process wherein a cap is applied to the bottle shortly after filling.

In many applications of the invention, for example dual ovenable food containers, it is desired that the cooling of the impact modified polyester or composition of the invention be at a uniform rate, and controlled such that the cooling process is isothermal or substantially isothermal with respect to the product. Cooling in this way minimizes the formation of internal stresses in the polymer structure, and thus minimizes the amount of stress release upon heating, as well as post-mold shrinkage. By isothermally as used herein, it is meant that the temperature of the impact modified polyester or composition of the invention be essentially the same throughout, such that thermal gradients are not formed in the material or are kept to a minimum. By substantially isothermally, it meant that any deviation from isothermal cooling is minimal such that the desired thermal dimensional stability of the product of the invention results in deformation of the product upon heating from about −60° C. to about 200° C. that does not exceed about 6%, preferably not exceeding about 5% and most preferably less than 3%.

As a result of the melt-to-mold thermoforming process of the invention, the crystals in the impact modified polyester so formed are highly developed, uniform in size and can be preferentially developed in three dimensions. Again, in contrast to conventional processes, wherein the crystals are in a large range of sizes and, in general, smaller than those of the present material and preferentially develop in primarily two dimensions. As a further result of the dynamic crystallization process, articles formed by the process of the invention are homogeneous throughout with respect to their morphology.

The impact modified polyester of the invention and article of the invention have many useful advantages over impact modified polyester materials heretofore available. Chief among these are high impact strength, dimensional stability at elevated temperature, low gas permeability, low degree of recrystallization upon heating as characterized by the ΔHr, each as described above, that the impact modified polyester of the invention imparts on the article of manufacture.

Another advantage of the invention is that since the product is molded directly from the molten state, the detail of the mold is more readily imparted on the shaped article. This is in contrast to lower temperature molding techniques where not all fine detail is imparted into the shape of the final product. Thus the invention provides for impact modified polyester articles that have more intricate design, thereby allowing for more distinguishing marking between similar products.

A further useful advantage of the product of the invention is that the material is recyclable by the methanolysis process of recycling polyesters. Thus, in addition to the cost savings afforded by recyclable products, the product of the invention is environmentally sound.

The manufacture of a myriad of articles are possible and useful in the practice of the process of the invention. Generally, any article that is currently made of impact modified polyester material is suitable to be made of the material of the invention. Preferred uses are to those articles that take special advantage of the gas permeability, thermal dimensional stability and improved impact strength of the impact modified polyester of the invention.

By way of example and not by way of limitation, the following articles are given to indicate potential articles manufactured under the practice of the invention: microwavable and ovenable food containers, including trays, boxes, pouches, bags, and the like; microwavable and ovenable liquid containers, for example for beverages, such as juices, milks, coffees, teas, water, carbonated drinks, and the like; packaging for materials that require sterilization by chemical, radiation, temperature, pressure or other means, such as pasteurization, autoclaving, peroxide treatment, oxide treatment, gamma radiation and the like, including medical supplies, pharmaceutical containers, chemical containers, food containers, and sundry items; and medical devices for which low gas permeability is an advantageous characteristic. Additionally, articles of the invention, again for example food containers, are also advantageously used at below ambient temperatures. For example, food containers of the invention are useful in frozen food applications, to temperatures at least to about −60° C., as a result of the improved dimensional stability of the product of the invention.

Furthermore the product of the invention has the additional advantage that it possesses a multi-use dimensional stability as it withstands multiple heat histories, for example temperature sterilization followed later by microwave or conventional oven heating. As another example, the product of the invention can withstand multiple sterilization processes, for example retort, or multiple reconstitution processes or a combination of the two due to its excellent dimensional stability.

As impact modified polyesters can be molded into an infinite number of shapes, the details of the shape of the surface are dependent only upon the choice of the article to be made. Thus, for example, in the manufacture of a food container, the surface in the process of the invention is one which imparts to the impact modified polyester composition the shape of a tray. Furthermore, details as to the article are also end use dependent. For example, whether a food container is to have one or multiple spaces capable of independently holding food. Products, such as food trays and similar containers are preferably made by a extrusion molding process in the practice of the invention.

Another article of the invention for which the impact modified polyester composition is useful is a bottle. Since the impact modified polyester provides a superior gas barrier to other currently available materials, a bottle made of the impact modified polyester of the invention is particularly useful for use with beverages, for example carbonated beverages, where the contents are under pressure. On the other hand, containers for holding items under vacuum are also provided by the present invention, again due to the superior gas permeability characteristics of the impact modified polyester polymer. The product of the invention may, but need not, be of uniform thickness as is desired by the end user.

There are numerous advantages provided by the product and process of the invention over those currently available. Foremost among these derive from the improved impact strength, low gas permeability and high dimensional stability of the material of the invention. As used as a container for food products, the material of the instant invention is microwavable (is penetrable by radiation in the microwave range and does not heat excessively upon exposure to power levels of this radiation used in conventional microwave ovens). The material of the invention is also ovenable to temperature of up to about 215° C., with less than 6% change, and preferably less than 5% change, in linear dimensional shrinkage. Containers made of the material of the invention also increase the shelf life of products stored either under pressure or under vacuum, since the gas permeability of the present material is lower than that previously available. Containers made of the material of the invention also provide for better taste and texture of the food contained therein, since the product of the invention can withstand higher temperatures without warping, breaking of seals, or other product failure, thereby allowing for reduced time at high temperature than is required when using previous products. For example, the product of the invention can withstand retort at from about 135° C. to about 175° C., which is higher than the retort temperature conventionally used (about 130° C.). Accordingly, the length of time of retort at temperature may be substantially reduced with the result that the time a foodstuff must be exposed to the retort temperature will also be reduced.

The following examples are put forth in order to assist those skilled in the art in the practice of the invention by way of illustration, and not meant to be construed as a limitation. Additional background material that may be of help to some practitioners may also be found in the patents referred to herein, each of which are hereby incorporated by reference.

EXAMPLES

The following oxygen transmission experiments were performed by Alcoa Laboratories "Oxtran" testing, at 23° C. and 60RH/100RH.

EXAMPLE 1
Melt-to-Mold Preparation of CPET Polyester and DSC Analysis

About 1000 pounds of a 50/50 regrind blend consisting of a 0.95 i.v. polyethylene terephthalate homopolymer (Goodyear Tire and Rubber Co. product no. 9506, sold under the tradename Cleartuf®) was pre-dried at about 330° F. for greater than 6 hours in a desiccant dryer to less than 50 ppm water. Approximately 50 pounds of a shell-core impact modifier (Rohm and Haas product no. 5375) was also pre-dried at about 210° F. for about 2.5 hrs in the same manner. To the impact modified polymer mix was added about 2.5 pounds of a linear low density polyethylene mold release agent (Goodyear Tire and Rubber product no. NA1, having a melt flow index of 0.9) and this mixture was added to the dried polyester in a Welex extruder using a standard polyester mixing screw (Davis Standard Co.). The material was directed through a melt pump to dampen pressure fluctuations, while being kept at a temperature between about 510° F. to about 550° F., and was then extruded in reverse profile with uniform melt temperature as a two dimensional sheet. The polyester sheet was then transferred into a conventional flexible lip-modified coat hanger die (EDI Co.) with the mold temperature set at about 365° F. The composition resided in the mold for about 40 sec. after which the molded polyester sheet was removed from the mold and allowed to further cool to ambient temperature. The average thickness of the polyester sheet was about 20 mils.

FIG. 1 depicts a differential scanning calorimetry (DSC) analysis of 6.200 mg of the CPET material made as described herein. The analysis was performed on a Perkin Elmer 7 Series Thermal Analysis System, as per the manufacturer's recommendations. The curve in FIG. 1 depicts DSC analysis of heating the material from about 90° C. to about 270° C. at a rate of 25° C./min. No exothermic recrystallization reaction is seen in the region between 90° C. and the of melting of the material (about 251° C.). The degree of crystallinity as calculated by the endothermic reaction between 182° C. and 265° C. of the material is determined from the calorimetric analysis to be about 29% using the equation:

$$\%C = (\Delta H_T \times 3.434) - 0.2804$$

where $\Delta H_T = \Delta H_r + \Delta H_p$ in calories per gram, and where $\Delta H_r$ is the enthalpy of recrystallization (taken as 0 in the calculation for the material in this Example) and $\Delta H_p$ is the enthalpy of melting (35.757 J/g in this Example), both as determined from the DSC thermogram, and % C. is the percent crystallinity of the material.

The foregoing analysis indicates that virtually all of the possible crystallizable material available at a cooling rate of 20° C./min has been crystallized, and that no recrystallization is detectable in this material using DSC. Thus, on heating the above material, there occurs little or no dimensional shrinkage in the polyester product due to recrystallization.

Samples made by the above process were tested as to their gas permeability as reflected in oxygen transmission rate analysis. The testing was done in a 10 cell "Oxtran" (Modern Controls, Minneapolis, Minn.), and performed by Alcoa Labs using standard package testing techniques. Test were performed at 23° C. and 60% outside relative humidity/ 100% inside relative humidity. Transfer analysis was after 5 and 21 days, with these figures extrapolated to yearly transmission rates. The mean transmission rate of seven tests were then used to calculate the oxygen permeability.

Table 1 shows the results of the transmission tests using samples with 25 in² surface area and 20 mil average thickness.

TABLE 1

| Sample | 5 day (cc/pkg) | | 21 day (cc/pkg) | |
|---|---|---|---|---|
| | day | year | day | year |
| 1 | 0.0119 | 4.344 | 0.0120 | 4.380 |
| 2 | 0.0119 | 4.344 | 0.0120 | 4.380 |
| 3 | 0.0113 | 4.125 | 0.0113 | 4.125 |
| 4 | 0.0121 | 4.417 | 0.0121 | 4.127 |
| 5 | 0.0120 | 4.380 | 0.0121 | 4.417 |
| 6 | 0.0117 | 4.271 | 0.0118 | 4.307 |
| 7 | 0.0109 | 3.979 | 0.0110 | 4.015 |

The oxygen permeability of this material based on either the 5 day tests or the 21 day tests was 0.94 cc-mil/100 in²-24 hr-atm.

EXAMPLE 2

A polyester composition was made essentially as described in Example 1, with the exception that the final molded sheet was of an average thickness of about 15 mil. Gas permeation tests were then performed on this material as in Example 1, with the results given in Table 2.

TABLE 2

| Sample | 5 day (cc/pkg) | | 21 day (cc/pkg) | |
|---|---|---|---|---|
| | day | year | day | year |
| 1 | 0.0086 | 3.139 | 0.0088 | 3.212 |
| 2 | 0.0083 | 3.011 | 0.0082 | 2.993 |
| 3 | 0.0093 | 3.376 | 0.0092 | 3.358 |
| 4 | 0.0090 | 3.285 | 0.0089 | 3.249 |

TABLE 2-continued

| | 5 day (cc/pkg) | | 21 day (cc/pkg) | |
|---|---|---|---|---|
| Sample | day | year | day | year |
| 5 | 0.0080 | 2.920 | 0.0081 | 2.951 |
| 6 | 0.0072 | 2.630 | 0.0075 | 2.738 |
| 7 | 0.0089 | 3.249 | 0.0085 | 3.103 |

The oxygen permeability based on the five day tests was calculated to be 0.81 cc-mil/100 in²-24 hr-atm while the 21 day tests yielded a permeability of 0.79 cc-mil/100 in²-24 hr-atm. A Goodyear Tire and Rubber Co. manual gives the oxygen permeability of standard Cleartuf® at 25° C. and 0% relative humidity as 10 cm³-mil/100 in²-day-atm for unoriented material and as 5 cm³-mil/100 in²-day-atm for oriented material. These tests were based on ASTM Test Method D-1434.

EXAMPLE 3

The procedure essentially as set forth in Example 1 was repeated using a 0.80 i.v. virgin polyethylene terephthalate homopolymer (Eastman Kodak Product no. 9902) in place of the 50/50 regrind, and 5% by weight, based upon the total weight of the composition, of the 5375 shell-core impact modifier as in Example 1. No NA1 mold release agent was incorporated into this mix. The polyester and impact modifier were both dried heated and molded as in Example 1. The average thickness of the final polyester sheet was 32 mil. A 3.3 mg sample of the polyester was then analyzed by differential scanning calorimetry.

Figure 2:
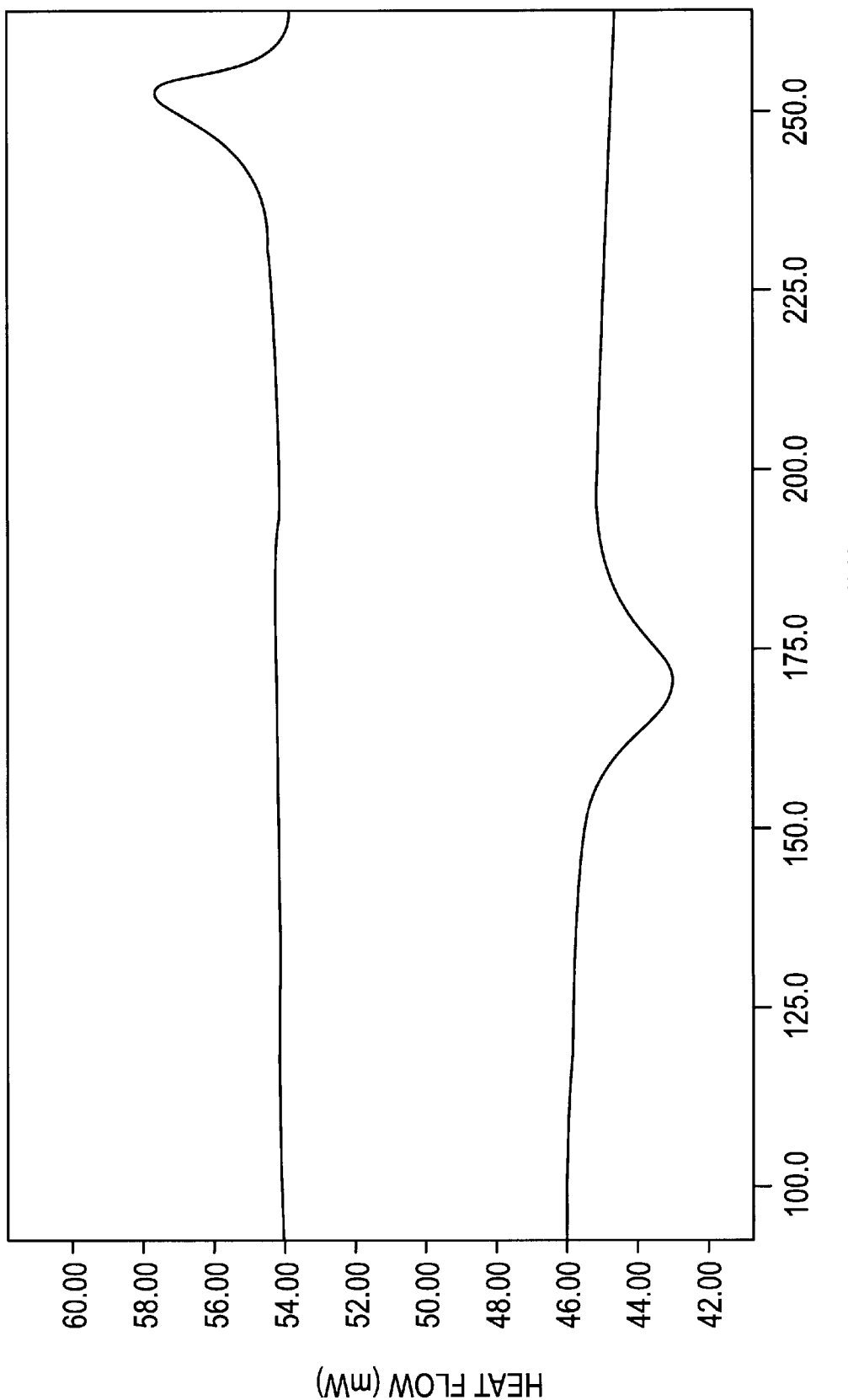
FIG. 2 depicts differential scanning calorimetry thermograms of a polyester composition made from the present melt-to-mold process as described in Example 3.

FIG. 2 depicts the results of the DSC analysis on 3.3 mg of this material. The upper curve shows no detectable recrystallization at temperatures below the melting temperature of the product upon heating at a rate of 20° C./min. The melting endotherm between 214° C. and 265° C. corresponds to a $\Delta H_p$ of 42.554 J/g, indicating that the product had a crystallinity of about 34.9% as calculated in Example 1.

The lower cooling curve exotherm between 205° C. and 119° C. indicated that at a cooling rate of 20° C./min the polyester material has a maximum crystallinity of about 36% ($\Delta H_T = -44.974$ J/g). In this, and other cooling DSC thermograms $\Delta H_T$ is the total enthalpy of the dynamic crystallization reaction, such that the percent crystallinity, % C. is calculated from the equation:

$$\%C = (\Delta H_T \times 3.434) - 0.2804$$

where $\Delta H_T$ corresponds to the enthalpy of dynamic crystallization in cal/gram.

As seen in the lower curve the upper crystallization onset temperature from melt of this material is about 185° C., the peak crystallization rate temperature from melt is about 170° C. and the lower boundary crystallization temperature is about 155° C., at this cooling rate.

The results obtained with this material again show that as determined by DSC analysis there is no detectable recrystallization, and thus little if any dimensional shrinkage due to recrystallization of the product upon heating.

EXAMPLE 4

The process of Example 3 was essentially repeated, with the exception that the polyester composition also contained 2.5% by weight, as compared to the weight of the homopolymer, the NA1 impact modifier as used in Example 1.

Figure 3:
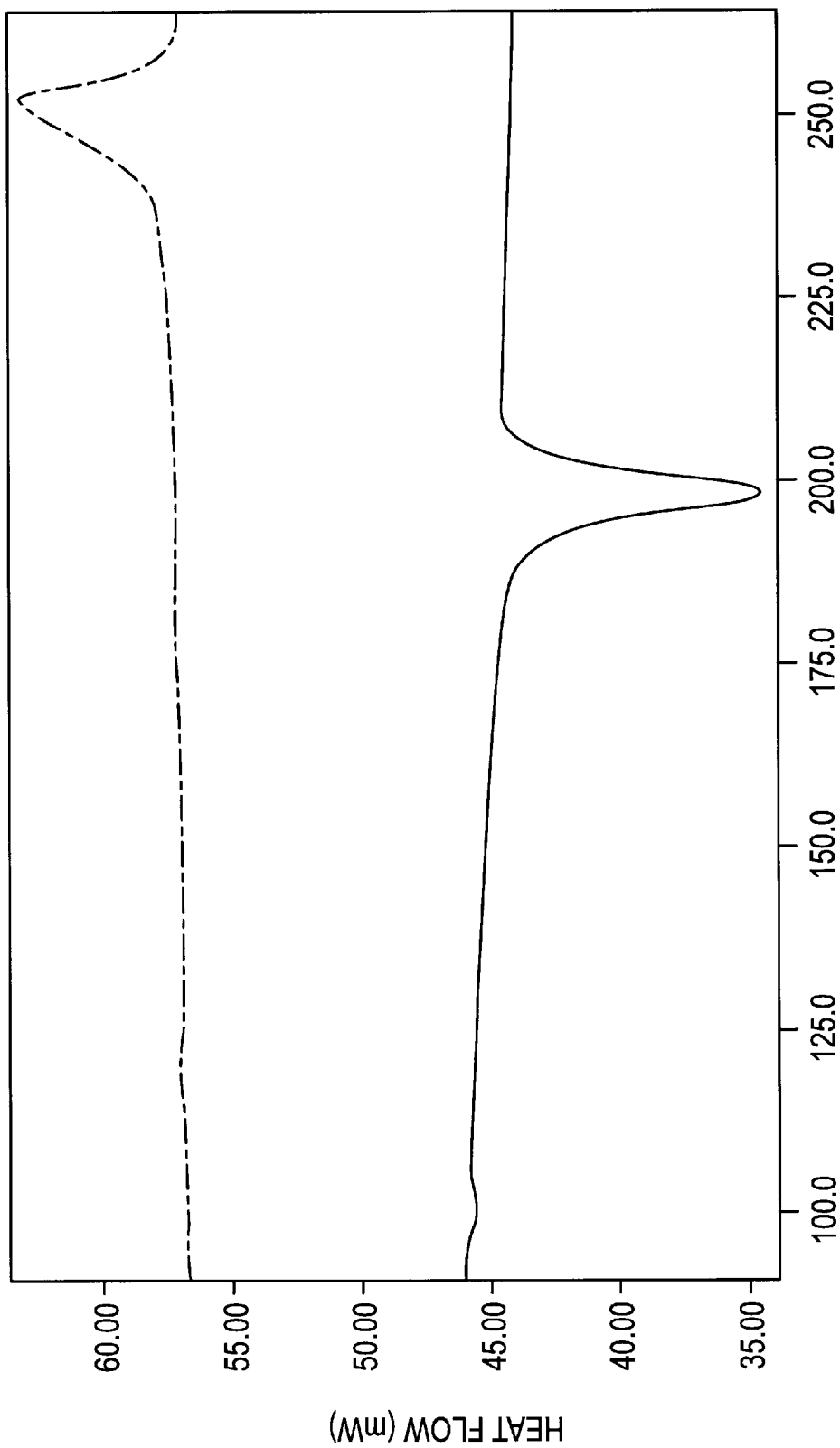
FIG. 3 depicts differential scanning calorimetry thermograms of a polyester composition made from the present melt-to-mold process as described in Example 4.

FIG. 3 depicts the DSC thermograms of 6.700 mg the product produced in this Example. The upper curve represents the DSC analysis of heating the polyester from about 90° C. to about 300° C., at a rate of 20° C./min. Melting of the material was complete at about 270° C. As in the previous Examples, there is no detectable recrystallization of the polyester material during the heating process. The melting endotherm between 162° C. and 274° C. yields an enthalpy of melting, $\Delta H_p$, of 40.339 J/G indicating that this material has a crystallinity of about 33%.

The lower curve in FIG. 3 is the DSC thermogram obtained by cooling the sample heated above to about 90° C. at a rate of 20° C./min. As determined from the crystallization exotherm, the crystallization onset temperature from melt is shown to be about 204° C., the peak crystallization rate temperature is about 198° C. and the lower boundary temperature of crystallization from melt is about 188° C. By this dynamic crystallization, the polyester was calculated to have a maximum crystallinity of about 36% at this cooling rate as determined by DSC. Taken together, the results in this Example indicate that the polyester material formed in the shaping process above contained about 97% of the amount of crystallizable material obtainable at this cooling rate.

EXAMPLE 5

The process essentially as described in Example 1 was repeated with the exception that no NA1 mold release agent was included in the polyester composition.

Figure 4:
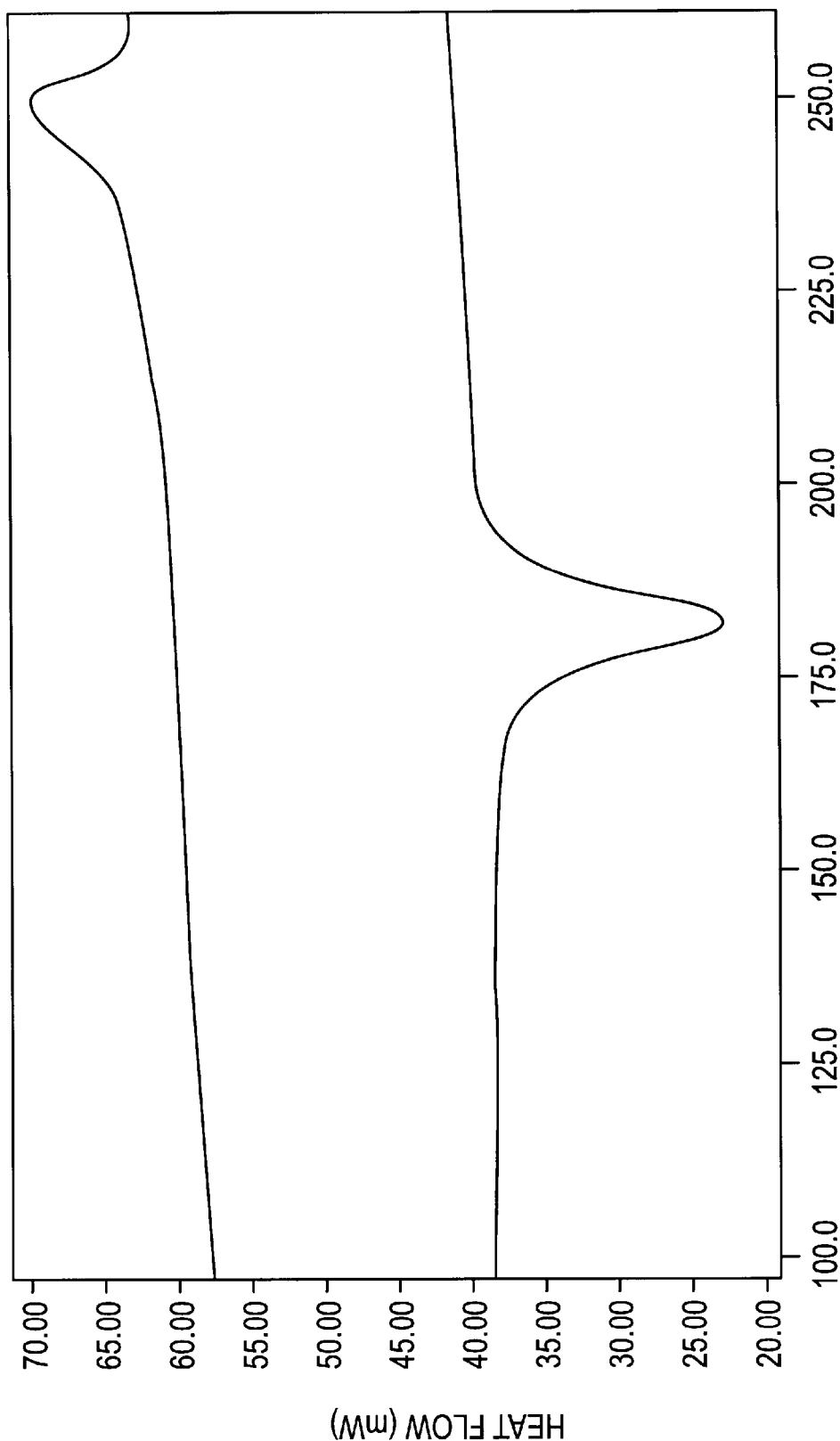
FIG. 4 depicts differential scanning calorimetry thermograms of a polyester composition made from the present melt-to-mold process as described in Example 5.

9.4 mg of this material was analyzed by DSC, with the resulting thermogram depicted in FIG. 4. Upon heating the sample from about 90° C. to about 300° C. at a rate of 20° C./min, no recrystallization exotherm was detected (upper curve). Upon cooling this material from about 300° C. to about 50° C. at a rate of 40° C./min, a dynamic crystallization was obtained as indicated by the crystallization exotherm. As determined from the dynamic crystallization exotherm, the crystallization onset temperature from melt was about 190° C., the peak crystallization rate temperature from melt was about 181° C., and the lower boundary temperature of crystallization from melt was about 165° C. The exotherm corresponds to a crystallinity of about 26% in this cooled sample. The material produced in the shaping process above has a crystallinity of about 98% that obtainable at a cooling rate of 40° C./min.

EXAMPLE 6

In an illustrative example of the invention, the process essentially as described is performed using only virgin 0.80 i.v. polyethylene terephthalate, without any additional additives. The product is expected to have an undetectable enthalpy of recrystallization at a heating rate of 25° C./min in DSC analysis.

EXAMPLE 7

The process as essentially described in Example 1 was repeated using a 0.95 i.v. polyethylene terephthalate homopolymer (Goodyear Tire and Rubber product no. 9506), 2.5% by weight linear low density polyethylene (NA1), but no impact modifier. However, instead of controlled cooling in the mold, the material of this Example was quick-cooled at about 100° C./min to thermally suppress dynamic crystallization of the polyester during the cooling process and thereby create a sheet of polyester with a very low crystallinity.

Figure 5:
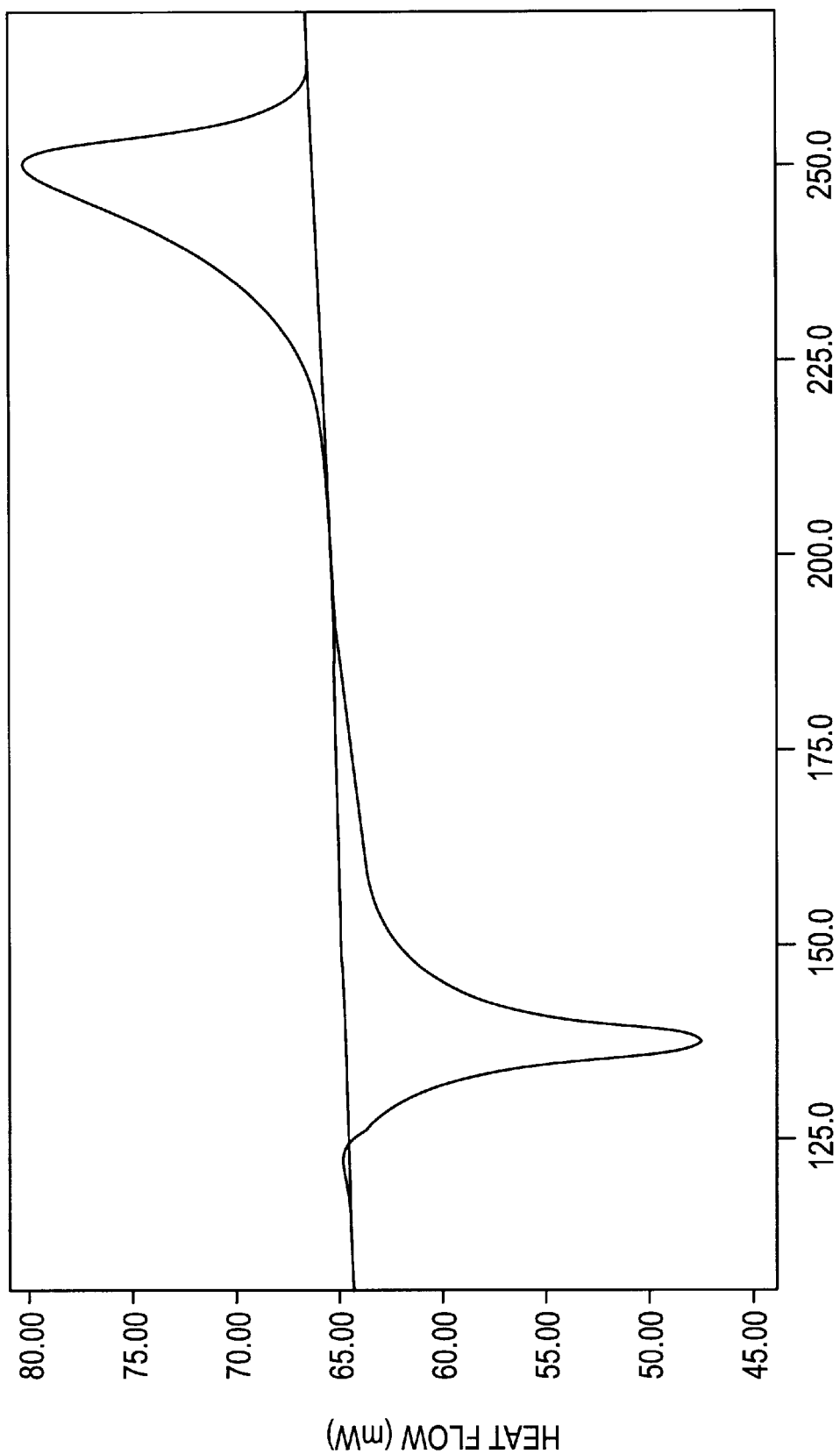
FIG. 5 depicts a differential scanning calorimetry thermogram of a polyester composition made as described in Example 7.

20.6 mg of this material was then analyzed by DSC, with the results of the heating DSC depicted in FIG. 5. The material was heated from about 50° C. to about 300° C. at a rate of 20° C./min. As can be seen by the large recrystallization exotherm located between about 125° C. and about 190° C., this material was highly amorphous at ambient temperature, as expected due to the thermal quenching of dynamic crystallization of the material during the prior cooling process. The total crystallinity of the material as calculated as the sum of the ΔH of recrystallization and the ΔH of melting indicated that the ambient material had a crystallinity of about 1.8%.

Due to the large degree of recrystallization upon heating of this highly amorphous polyester, this material has a low dimensional stability resulting from recrystallization. As calculated from the recrystallization exotherm in FIG. 5, recrystallization accounted for an increase in crystallinity of this material (amorphous PET) to over about 27% during the heating process, which would suggest a substantial deformation of the material upon heating.

EXAMPLE 8

The process essentially as described in Example 1 was repeated with the polyester being Goodyear Tire & Rubber 0.95 i.v. PET homopolymer (9506) with NA1 added to 2.5% by weight based on the total weight of the composition, with the exception that the material was cooled in contact with the mold for only 16 seconds, a suboptimal time at temperature for the dynamic crystallization of this material.

Figure 6:
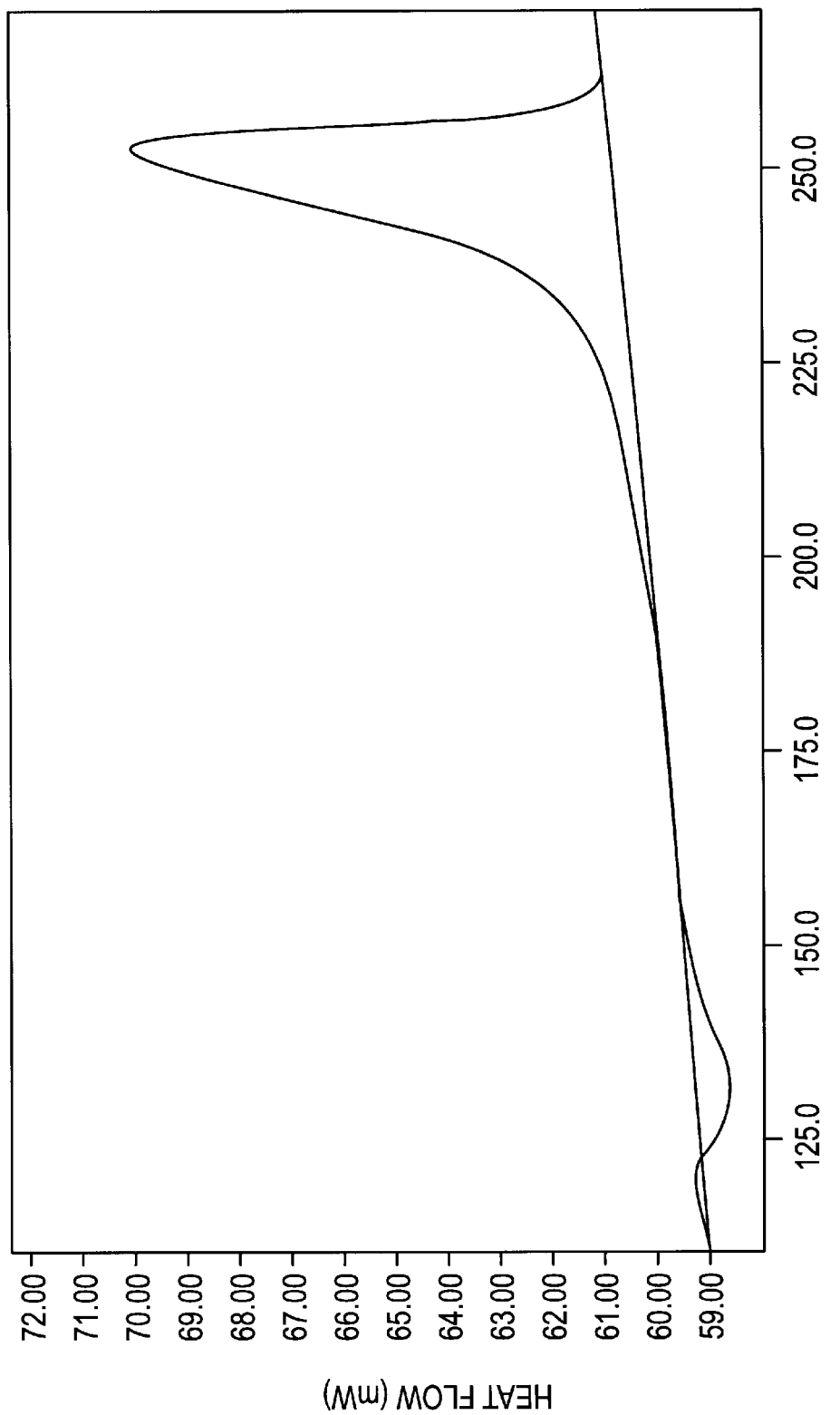
FIG. 6 depicts a differential scanning calorimetry thermogram of a polyester composition made as described in Example 8.

FIG. 6 depicts a DSC thermogram upon heating 11.6 mg of the polyester of this Example from about 50° C. to about 300° C., at a rate of 20° C./min. An exothermic recrystallization is detected between about 125° C. and about 175° C., indicating that this material would exhibit excessive shrinkage at these elevated temperatures due to the recrystallization process. The total crystallinity of this material is calculated from the DSC to be about 26% of which greater than about 9% is due to recrystallization upon heating

EXAMPLE 9

A commercial PET product made by the glass-to-mold process was obtained and analyzed by DSC to determine the amount of recrystallization upon heating.

Figure 7:
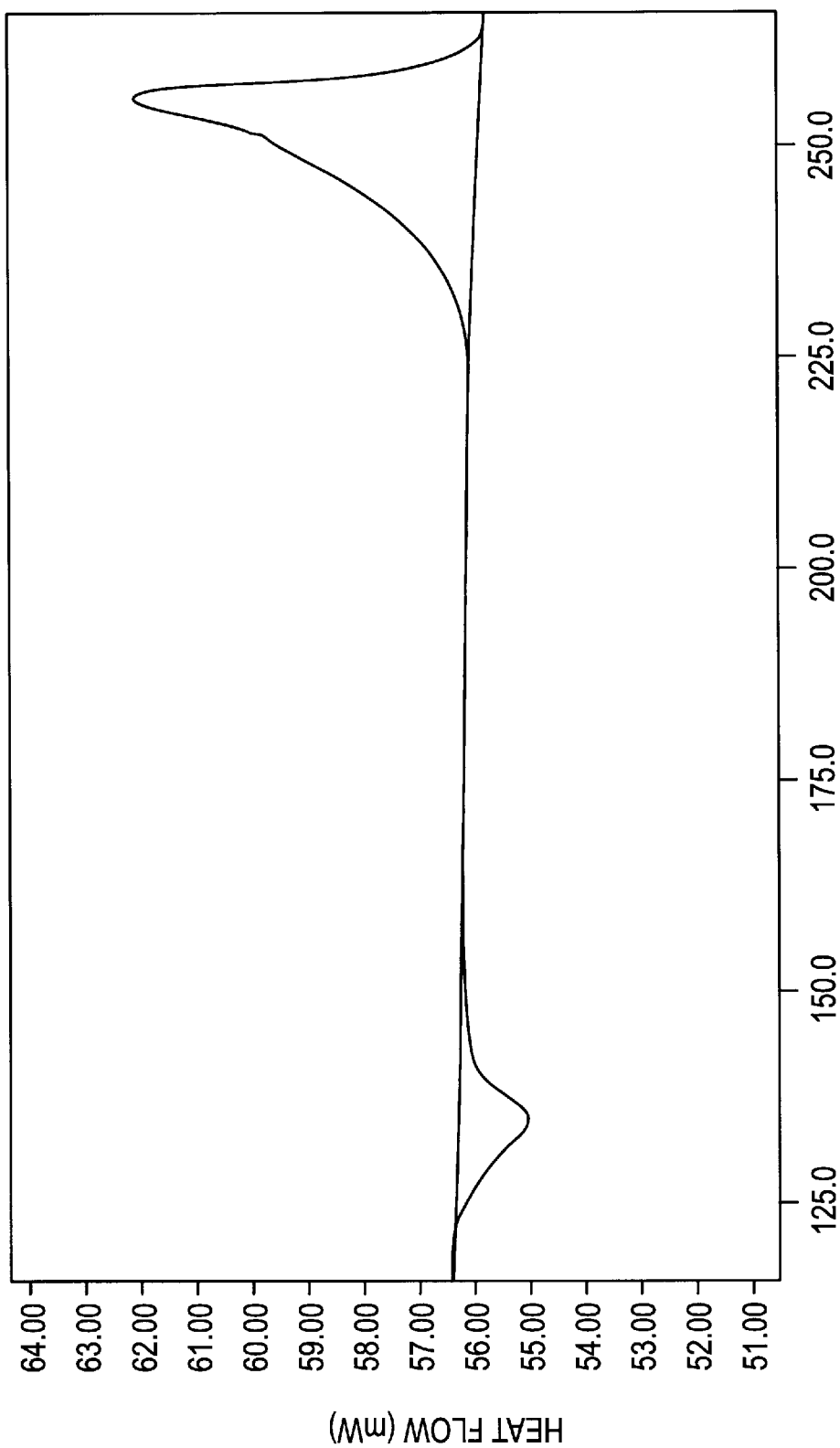
FIG. 7 depicts a differential scanning calorimetry thermogram of a polyester composition made from a prior glass-to-mold process as described in Example 9.

6.0 mg of the product of this Example was analyzed by DSC by heating the material from about 50° C. to about 300° C., at a rate of 20° C./min. The resulting thermogram is depicted in FIG. 7. As can be seen from the Figure, significant recrystallization was detected, as is evidenced by exotherm between about 120° C. and about 170° C. As in the previous Comparative Examples, this material would also exhibit excess shrinkage (low dimensional stability) at elevated temperatures due to the recrystallization process.

EXAMPLE 10

Another commercial product consisting of polyethylene terephthalate made by the glass-to-mold, two-step manufacturing process was analyzed by DSC to determine the amount of recrystallization the product undergoes with heating.

Figure 8:
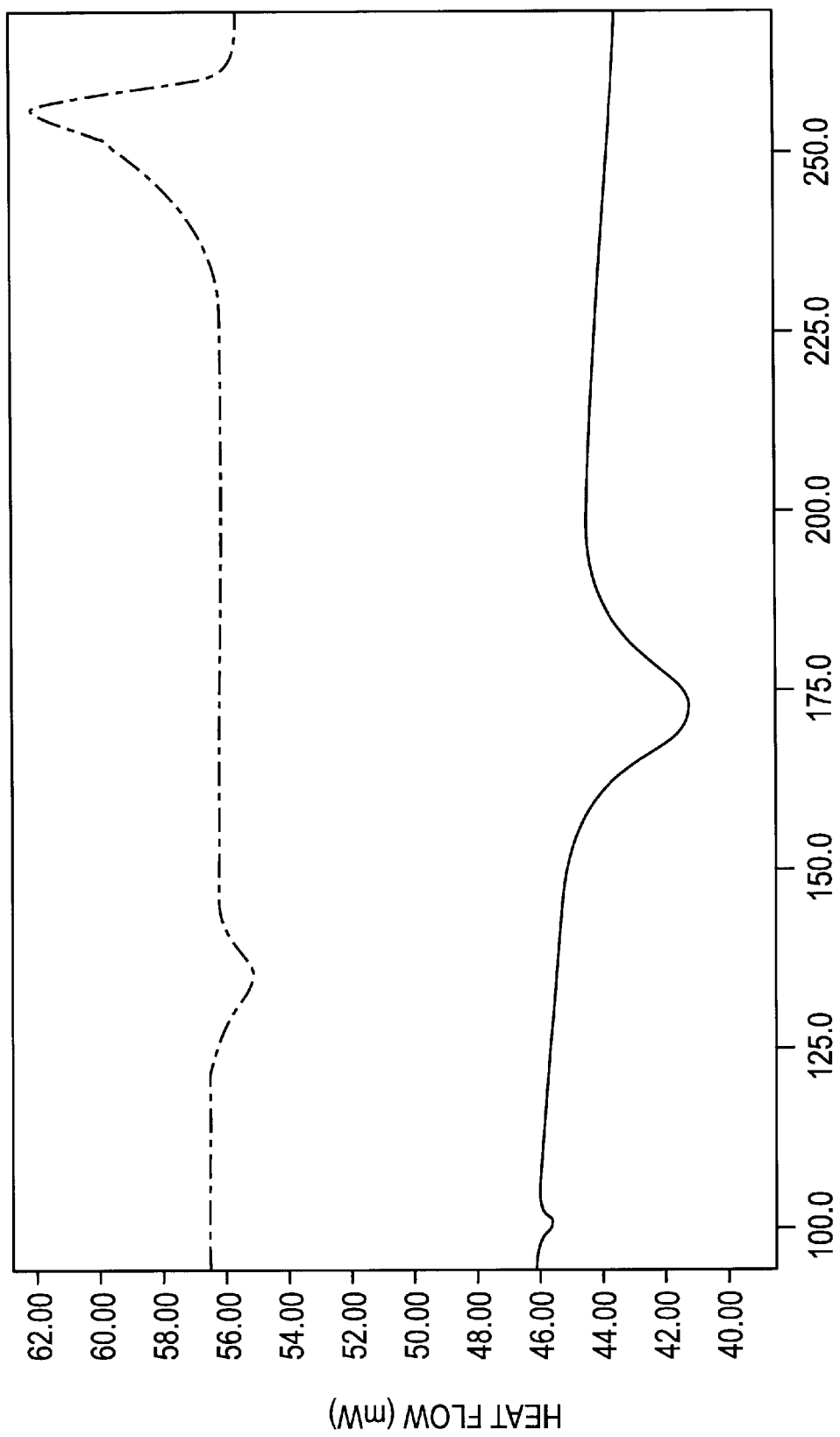
FIG. 8 depicts differential scanning calorimetry thermograms of a polyester composition made by a prior glass-to-mold process as described in Example 10.

FIG. 8 depicts a thermogram resulting from DSC analysis of 6.0 mg of the material in this example. The upper curve represents the thermogram resulting from heating the sample from about 50° C. to about 300° C. at a rate of 25° C./min. As can be seen from the recrystallization exotherm between about 120° C. and about 140° C., this material undergoes substantial recrystallization, an thus is expected to have significant shrinkage due to recrystallization at these elevated temperatures.

EXAMPLE 11

Figure 9:
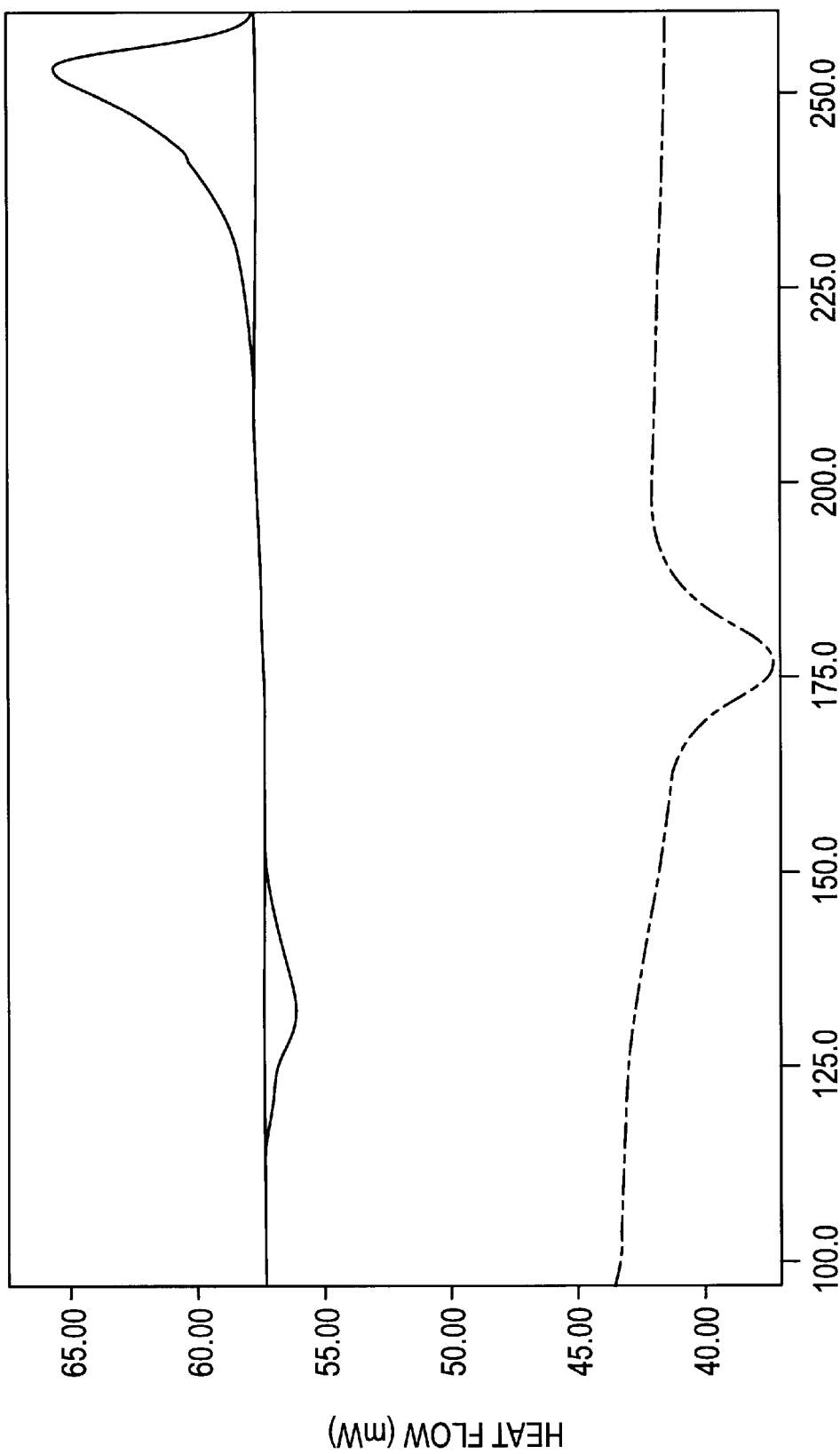
FIG. 9 depicts differential scanning calorimetry thermograms of a polyester composition described in Example 11.

Another commercial polyethylene terephthalate product was purchased and tested by DSC for propensity to recrystallize at elevated temperature. The thermograms resulting from the DSC analysis are depicted in FIG. 9.

The upper curve represents the thermogram obtained upon heating 9.8 mg of the cup material from about 50° C. to about 300° C. at a rate of 20° C./min. A recrystallization exotherm is detected between about 115° C. and about 160° C. As calculated from the heating thermogram, the crystalline content of this material was increased more than 4% during the heating process.

EXAMPLE 12

Figure 10:
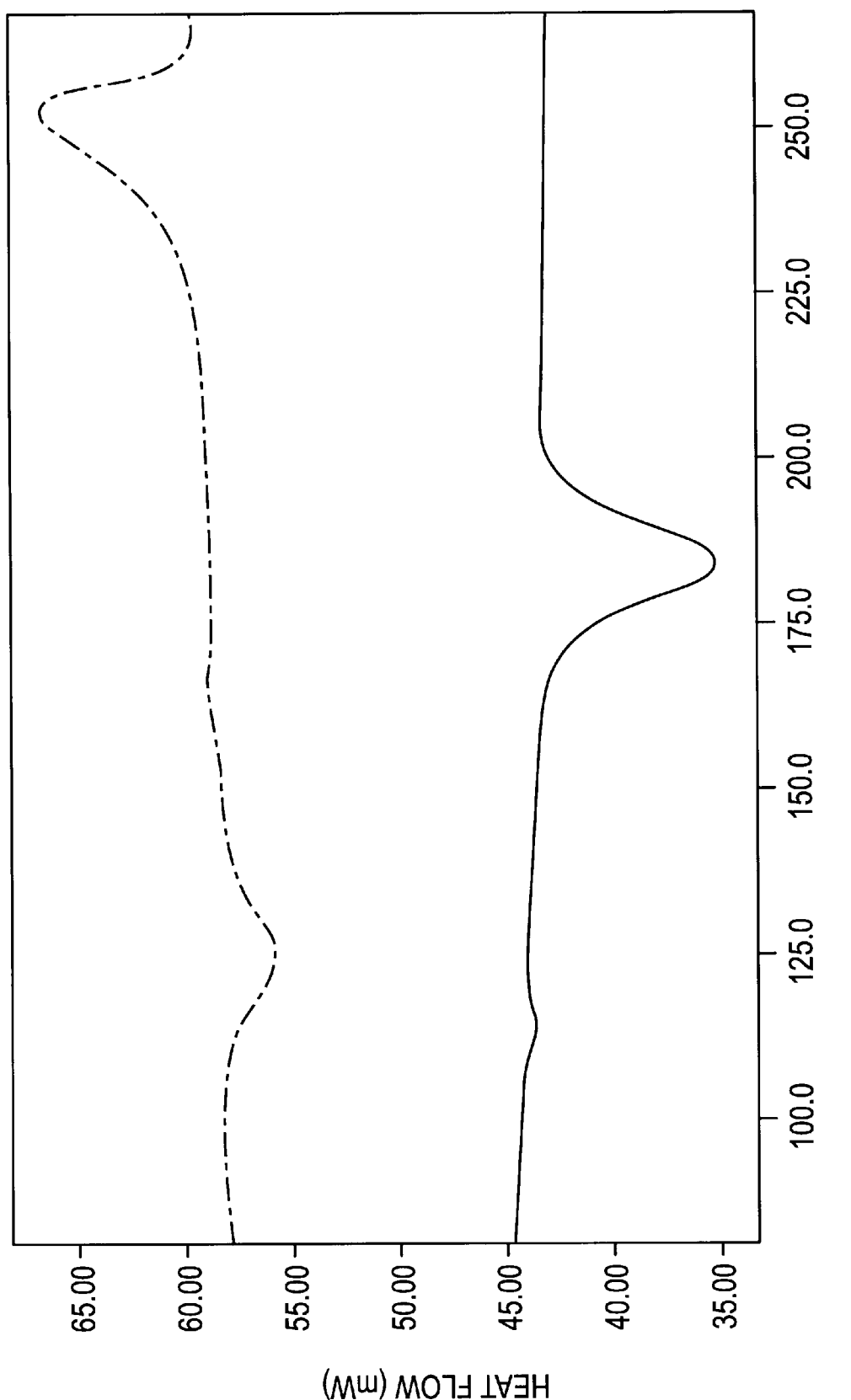
FIG. 10 depicts differential scanning calorimetry thermograms of a polyester composition made as described in Example 12.

10.2 mg of another commercially available polyethylene terephthalate product was analyzed by DSC to determine the propensity of this product to recrystallize upon heating. This product is believed to be made by the two stage process where the polyester was originally manufactured by a process which thermally suppresses crystallization upon cooling. FIG. 10 depicts the thermograms resulting from the DSC analysis.

The upper curve in FIG. 10 is the thermogram resulting from heating the polyester material from about 50° C. to about 340° C. at a rate of 20° C./min. An exothermic recrystallization reaction is easily detected between about 110° C. and about 140° C., indicating that this product is also dimensionally unstable due to recrystallization upon heating. The total crystallinity of the product was determined to be about 17% of which about 11% was due to recrystallization, indicating the crystallinity of the product increased by about 1.8 times that originally in the product at ambient temperature.

The lower curve in FIG. 10 represents the DSC thermogram obtained from cooling the material of this Example from about 340° C. to about 20° C., at a rate of 20° C./min. A dynamic crystallization reaction was detected in the analysis. As determined from this exothermic reaction, the maximum crystallinity attainable at this rate of cooling is about 32%, indicating that the original product was only about one-third as crystallized as is possible for this material.

EXAMPLE 13

Figure 11:
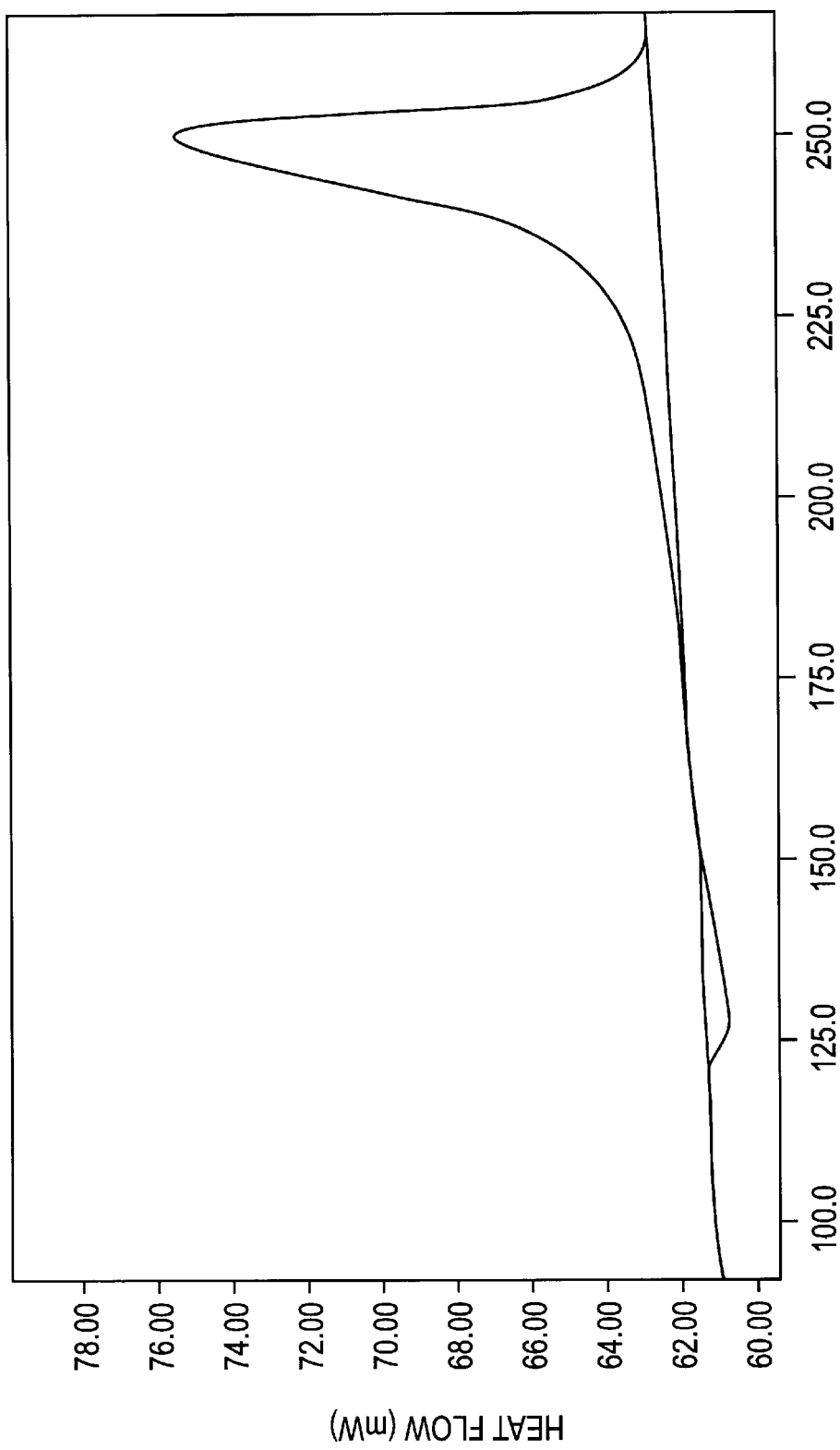
FIG. 11 depicts differential scanning calorimetry thermogram of a polyester composition described in Example 13.

Another commercially available polyester was tested for recrystallization at elevated temperatures by DSC analysis. 16.4 mg of the product was heated from about 40° C. to about 340° C. at a rate of 20° C./min, with the resulting thermogram depicted in FIG. 11. As in each of the other Comparative Examples, a significant amount of recrystallization was observed as is evidence by the exothermic reaction between about 120° C. and about 155° C. Based upon the data in FIG. 11, the crystallinity of the product material increased by about 1.5% upon heating.

EXAMPLE 14

Melt-to-mold Preparation of CPET Impact Modified Polyester and DSC Analysis

A 50/50 regrind blend consisting of 95 i.v. polyethylene terephthalate homopolymer (Goodyear Tire and Rubber Co.

product no. 9506, sold under the tradename Cleartuf® was pre-dried at about 330° F. for greater than 6 hours in a desiccant dryer to less than 50 ppm water. Approximately 10% by weight of a shell-core impact modifier (Rohm and Haas product no. 5375) was also pre-dried at about 210° F. for about 2.5 hrs in the same manner. To the impact modified polymer mix was added about 2.7% by weight of a linear low density polyethylene mold release agent (Goodyear Tire and Rubber product no. NA1, having a melt flow index of 0.9) and this mixture was added to the dried polyester in a Welex extruder using a standard polyester mixing screw (Davis Standard Co.). The material was directed through a melt pump to dampen pressure fluctuations, while being kept at a temperature between about 510° F. to about 550° F., and was then extruded in reverse profile with uniform melt temperature as a two dimensional sheet. The polyester sheet was then transferred into a conventional flexible lip-modified coat hanger die (EDI Co.) with the mold temperature set at about 365° F. The composition resided in the mold for about 40 sec. after which the molded polyester sheet was removed from the mold and allowed to further cool to ambient temperature. The average thickness of the polyester sheet was from about 14 to about 20 mils.

A differential scanning calorimetry (DSC) analysis of the CPET material made as described herein. The analysis was performed on a Perkin Elmer 7 Series Thermal Analysis System, as per the manufacturer's recommendations. The sample was analyzed with a heating rate of 20° C. per minute. No exothermic recrystallization reaction is seen in the region between 90° C. and the of melting of the material (about 251° C.). The degree of crystallinity as calculated by the endothermic reaction of the material is determined from the calorimetric analysis to be from about 26 to about 29% using the equation:

$$\%C = (\Delta H_T \times 3.434) - 0.2804$$

where $\Delta H_T = \Delta H_r + \Delta H_p$ in calories per gram, and where $\Delta H_r$ is the enthalpy of recrystallization (taken as 0 in the calculation for the material in this Example) and $\Delta H_p$ is the enthalpy of melting (35.757 J/g in this Example), both as determined from the DSC thermogram, and $\%C$ is the percent crystallinity of the material.

The foregoing analysis indicates that virtually all of the possible crystallizable material available at a cooling rate of 20° C./min has been crystallized, and that no recrystallization is detectable in this material using DSC. Thus, on heating the above material, there occurs little or no dimensional shrinkage in the polyester product due to recrystallization.

Samples made by the above process were tested as to their impact strength using a Gardner type impact test. The tests were conducted at ambient temperature and humidity. Table 3 shows the results of the impact tests.

TABLE 3

| Sample # | Impact (IN-LBS.) |
| --- | --- |
| 1 | 32 |
| 2 | 32 |
| 3 | 24 |
| 4 | 32 |
| 5 | 24 |
| 6 | 32 |

TABLE 3-continued

| Sample # | Impact (IN-LBS.) |
| --- | --- |
| 7 | 24 |
| 8 | 24 |
| 9 | 24 |
| 10 | 32 |
| 11 | 32 |
| 12 | 24 |
| 13 | 32 |
| 14 | 48 |
| 15 | 24 |
| 16 | 32 |
| 17 | 32 |
| 18 | 24 |
| 19 | 32 |
| 20 | 24 |
| 21 | 24 |
| 22 | 32 |
| 23 | 32 |
| 24 | 32 |
| 25 | 32 |
| 26 | 40 |
| 27 | 32 |
| 28 | 32 |
| 29 | 32 |
| 30 | 24 |
| 31 | 32 |
| 32 | 24 |
| 33 | 24 |
| 34 | 32 |
| 35 | 32 |
| 36 | 32 |
| 37 | 32 |
| 38 | 24 |
| 39 | 32 |
| 40 | 32 |
| 41 | 40 |
| 42 | 40 |
| 43 | 40 |
| 44 | 40 |
| 45 | 48 |
| 46 | 40 |
| 47 | 32 |
| 48 | 40 |
| 49 | 48 |
| 50 | 40 |

The impact strength of this material had a low of 24 in-lbs, a high of 48 in-lbs, and the average impact strength was 32 in-lbs.

EXAMPLE 15

Melt-to-mold Preparation of CPET Impact Modified Polyester and DSC Analysis

A 50/50 regrind blend consisting of a 0.95 i.v. polyethylene terephthalate homopolymer (Goodyear Tire and Rubber Co. product no. 9506, sold under the tradename Cleartuf®) was pre-dried at about 330° F. for greater than 6 hours in a desiccant dryer to less than 50 ppm water. Approximately 2.5% by weight of a shell-core impact modifier (Rohm and Haas product no. 5375) was also pre-dried at about 210° F. for about 2.5 hrs in the same manner. To the impact modified polymer mix was added about 1.2% by weight of a linear low density polyethylene mold release agent (Goodyear Tire and Rubber product no. NA1, having a melt flow index of 0.9) to this mixture was added 18% by weight of another mixture of consisting of 30% of a grade 144 polycarbonate sold by General Electric Company and 70% of a developmental grade ethylenebutyl acrylate copolymer (Chevron Chemical Company no. DS1120-70). This combined mixture was added to the dried polyester in a Welex extruder using a standard polyester mixing screw (Davis Standard Co.). The material was directed through a melt pump to dampen pressure fluctuations, while being kept at a temperature between about 510° F. to about 550° F.°, and was then extruded in reverse profile with uniform melt temperature as a two dimensional sheet. The polyester sheet was then transferred into a conventional flexible lip-modified coat hanger die (EDI Co.) with the mold temperature set at about 365° F. The composition resided in the mold for about 40 sec. after which the molded polyester sheet was removed from the mold and allowed to further cool to ambient temperature. The average thickness of the polyester sheet was from about 19 to about 32 mils.

A differential scanning calorimetry (DSC) analysis of the CPET material made as described herein. The analysis was performed on a Perkin Elmer 7 Series Thermal Analysis System, as per the manufacturer's recommendations. The sample was analyzed with a heating rate of 20° C. per minute. No exothermic recrystallization reaction is seen in the region between 90° C. and the of melting of the material (about 251° C.). The degree of crystallinity as calculated by the endothermic reaction of the material is determined from the calorimetric analysis to be about 26 using the equation:

$$\%C = (\Delta H_T \times 3.434) - 0.2804$$

where $\Delta H_T = \Delta H_r + \Delta H_p$ in calories per gram, and where $\Delta H_r$ is the enthalpy of recrystallization (taken as 0 in the calculation for the material in this Example) and the $\Delta H_p$ is the enthalpy of melting (35,757 J/g in this Example, both as determined from the DSC thermogram, and %C is the percent crystallinity of the material.

The foregoing analysis indicates that virtually all of the possible crystallizable material available at a cooling rate of 20° C./min has been crystallized, and that no recrystallization is detectable in this material using DSC. Thus, on heating the above material, there occurs little or no dimensional shrinkage in the polyester product due to recrystallization.

Samples made by the above process were tested as to their impact strength using a Gardner type impact test. The tests were conducted at ambient temperature and humidity. Table 4 shows the results of the impact tests.

TABLE 4

| Sample # | Impact (IN-LBS.) |
| --- | --- |
| 1 | 56 |
| 2 | 80 |
| 3 | 56 |
| 4 | 72 |
| 5 | 72 |
| 6 | 80 |
| 7 | 56 |
| 8 | 72 |
| 9 | 64 |
| 10 | 64 |
| 11 | 56 |
| 12 | 72 |
| 13 | 64 |
| 14 | 72 |
| 15 | 80 |
| 16 | 64 |
| 17 | 56 |
| 18 | 80 |
| 19 | 80 |
| 20 | 72 |
| 21 | 72 |

TABLE 4-continued

| Sample # | Impact (IN-LBS.) |
| --- | --- |
| 22 | 72 |
| 23 | 88 |
| 24 | 80 |
| 25 | 88 |
| 26 | 104 |
| 27 | 88 |
| 28 | 80 |
| 29 | 72 |
| 30 | 88 |

The impact strength of this material had a low of 56 in-lbs, a high of 104 in-lbs, and the average impact strength was 73 in-lbs.

EXAMPLE 16

Melt-to-mold Preparation of CPET Impact Modified Polyester and DSC Analysis

A 50/50 regrind blend consisting of a 0.95 i.v. polyethylene terephthalate homopolymer (Goodyear Tire and Rubber Co. product no. 9506, sold under the tradename Cleartuf®) was pre-dried at about 330° F. for greater than 6 hours in a desiccant dryer to less than 50 ppm water. Approximately 2.5% by weight of a shell-core impact modifier (Rohm and Haas product no. 5375) was also pre-dried at about 210° F. for about 2.5 hrs in the same manner. To the impact modified polymer mix was added about 1.2% by weight of a linear low density polyethylene mold release agent (Goodyear Tire and Rubber product no. NA1, having a melt flow index of 0.9) to this mixture was added 0% by weight of another mixture of consisting of 30% of a grade 144 polycarbonate sold by General Electric Company and 70% of a developmental grade ethylenebutyl acrylate copolymer (Chevron Chemical Company no. DS1120-70). This combined mixture was added to the dried polyester in a Welex extruder using a standard polyester mixing screw (Davis Standard Co.). The material was directed through a melt pump to dampen pressure fluctuations, while being kept at a temperature between about 510° F. to about 550° F., and was then extruded in reverse profile with uniform melt temperature as a two dimensional sheet. The polyester sheet was then transferred into a conventional flexible lip-modified coat hanger die (EDI Co.) with the mold temperature set at about 365° F. The composition resided in the mold for about 40 sec. after which the molded polyester sheet was removed from the mold and allowed to further cool to ambient temperature. The average thickness of the polyester sheet was from about 26 to about 31 mils.

A differential scanning calorimetry (DSC) analysis of the CPET material made as described herein. The analysis was performed on a Perkin Elmer 7 Series Thermal Analysis System, as per the manufacturer's recommendations. The sample was analyzed with a heating rate of 20° C. per minute. No exothermic recrystallization reaction is seen in the region between 90° C. and the of melting of the material (about 251° C.). The degree of crystallinity as calculated by the endothermic reaction of the material is determined from the calorimetric analysis to be about 31% using the equation:

$$\%C = (\Delta H_T \times 3.434) - 0.2804$$

where $\Delta H_T = \Delta H_r + \Delta H_p$ in calories per gram, and where $\Delta H_r$ is the enthalpy of recrystallization (taken as 0 in the calculation for the material in this Example) and $\Delta H_p$ is the enthalpy of melting (35.757 J/g in this Example), both as determined from the DSC thermogram, and %C is the percent crystallinity of the material.

The foregoing analysis indicates that virtually all of the possible crystallizable material available at a cooling rate of 20° C./min has been crystallized, and that no recrystallization is detectable in this material using DSC. Thus, on heating the above material, there occurs little or no dimensional shrinkage in the polyester product due to recrystallization.

Samples made by the above process were tested as to their impact strength using a Gardner type impact test. The tests were conducted at ambient temperature and humidity. Table 5 shows the results of the impact tests.

TABLE 5

| Sample # | Impact (IN-LBS.) |
| --- | --- |
| 1 | 56 |
| 2 | 64 |
| 3 | 64 |
| 4 | 56 |
| 5 | 56 |
| 6 | 64 |
| 7 | 48 |
| 8 | 64 |
| 9 | 48 |
| 10 | 48 |
| 11 | 64 |
| 12 | 56 |
| 13 | 56 |
| 14 | 48 |
| 15 | 56 |
| 16 | 56 |
| 17 | 56 |
| 18 | 56 |
| 19 | 56 |
| 20 | 56 |
| 21 | 48 |
| 22 | 48 |
| 23 | 56 |
| 24 | 56 |
| 25 | 56 |

The impact strength of this material had a low of 48 in-lbs, a high of 64 in-lbs, and the average impact strength was 53 in-lbs.

EXAMPLE 17

Melt-to-mold Preparation of CPET Impact Modified Polyester and DSC Analysis

A blend consisting of a 0.95 i.v. polyethylene terephthalate homopolymer (Goodyear Tire and Rubber Co. product no. 9506, sold under the tradename Cleartuf®) was pre-dried at about 330° F. for greater than 6 hours in a desiccant dryer to less than 50 ppm water. To this was added 10% by weight of another mixture of consisting of 30% of a grade 144 polycarbonate sold by General Electric Company and 70% of a developmental grade ethylene-butyl acrylate copolymer (Chevron Chemical Company no. DS1120-70). This combined mixture was added to the dried polyester in a Welex extruder using a standard polyester mixing screw (Davis Standard Co.). The material was directed through a melt pump to dampen pressure fluctuations, while being kept at a temperature between about 510° F. to about 550° F.°, and was then extruded in reverse profile with uniform melt temperature as a two dimensional sheet. The polyester sheet was then transferred into a conventional flexible lip-modified coat hanger die (EDI Co.) with the mold temperature set at about 365° F. The composition resided in the mold for about 40 sec. after which the molded polyester sheet was removed from the mold and allowed to further cool to ambient temperature. The average thickness of the polyester sheet was from about 12 to about 19 mils.

A differential scanning calorimetry (DSC) analysis of the CPET material made as described herein. The analysis was performed on a Perkin Elmer 7 Series Thermal Analysis System, as per the manufacturer's recommendations. The sample was analyzed with a heating rate of 20 ° C. per minute. No exothermic recrystallization reaction is seen in the region between 90° C. and the of melting of the material (about 251° C.). The degree of crystallinity as calculated by the endothermic reaction of the material is determined from the calorimetric analysis to be from about 27% to about 30% using the equation:

$$\%C = (\Delta H_T \times 3.434) - 0.2804$$

where $\Delta H_T = \Delta H_r + \Delta H_p$ in calories per gram, and where $\Delta H_r$ is the enthalpy of recrystallization (taken as 0 in the calculation for the material in this Example) and $\Delta H_p$ is the enthalpy of melting (35.757 J/g in this Example), both as determined from the DSC thermogram, and %C is the percent crystallinity of the material.

The foregoing analysis indicates that virtually all of the possible crystallizable material available at a cooling rate of 20° C./min has been crystallized, and that no recrystallization is detectable in this material using DSC. Thus, on heating the above material, there occurs little or no dimensional shrinkage in the polyester product due to recrystallization.

Samples made by the above process were tested as to their impact strength using a Gardner type impact test. The tests were conducted at ambient temperature and humidity. Table 6 shows the results of the impact tests.

TABLE 6

| Sample # | Impact (IN-LBS.) |
| --- | --- |
| 1 | 72 |
| 2 | 88 |
| 3 | 64 |
| 4 | 56 |
| 5 | 64 |
| 6 | 104 |
| 7 | 104 |
| 8 | 80 |
| 9 | 88 |
| 10 | 72 |
| 11 | 80 |
| 12 | 80 |
| 13 | 56 |
| 14 | 56 |
| 15 | 72 |
| 16 | 72 |
| 17 | 88 |
| 18 | 80 |
| 19 | 88 |
| 20 | 56 |
| 21 | 72 |
| 22 | 80 |
| 23 | 88 |
| 24 | 64 |
| 25 | 64 |
| 26 | 72 |

The impact strength of this material had a low of 56 in-lbs, a high of 104 in-lbs, and the average impact strength was 75 in-lbs.

It is understood that various other modifications will be apparent to and can be readily made by those skilled in the art without departing from the scope and spirit of this invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A drawing thermoforming process for producing a dimensionally-stable, impact modified polyester with improved low temperature impact strength and improved gas barrier properties comprising the steps:
   (a) heating a composition comprising a crystallizable polyester and an impact modifier to a temperature above the melting point temperature of the polyester for a time sufficient to bring said polyester to a substantially amorphous molten state;
   (b) maintaining the composition heated in step (a) at a temperature above said melting point temperature for a time sufficient to substantially eliminate previous molecular stress imprinting and until an effective amount of said impact modifier is dissolved in said polyester;
   (c) controlling cooling of the composition in step (b) at a rate of from about 1° C. to about 89° C. per minute until there is crystallization of the polyester and impact modifier forming a mixture of precipitated particles of impact modifier embedded in a matrix of the polyester, said precipitate of the impact modifier having a particle size of from about 0.1 to about 10 microns in diameter; and
   (d) continuing controlled cooling of the composition by contacting the composition to a surface capable of imparting shape for from about 1 second to about 5 minutes, said contact surface being at a temperature of at least the lower boundary crystallization from melt temperature of said polyester
   to provide an impact modified polyester, wherein said impact modified polyester has an oxygen permeability of from about 0.2 to about 4.0 cc-mil/100 in$^2$-24 hr-atm at 23° C. and 60% relative humidity outside/100% relative humidity inside and a heat of recrystallization of from about 0 to about −4.0 calories per gram as measured by differential scanning calorimetry at a heating rate of about 25° C./minute.

2. The process as set forth in claim 1, wherein in step (a) said impact modifier is selected from the group consisting of polypropylene, polyisopropylene, polybutadiene, polyethylene-methylacrylate, polyethylene-butylacrylate, polyethylene-maleic acid copolymers and polymethyl-methacrylate-polycarbonate shell core modifier.

3. The process as set forth in claim 2, wherein step (a) said impact modifier means is a copolymer with a glass transition temperature from about −150° C. to about −20° C.

4. The process as set forth in claim 1, wherein said impact modified polyester has an oxygen permeability of from about 0.2 to about 3.0 cc-mil/100 in$^2$-24 hr-atm at 23° C. and 60% relative humidity outside/100% relative humidity inside.

5. The process as set forth in claim 1, wherein said impact modified polyester has an oxygen permeability of from about 0.2 to about 2.0 cc-mil/100 in$^2$-24 hr-atm at 23° C. and 60% relative humidity outside/100% relative humidity inside.

6. The process as set forth in claim 1, wherein said impact modified polyester has an oxygen permeability of from about 0.2 to about 1.5 cc-mil/100 in$^2$-24 hr-atm at 23° C. and 60% relative humidity outside/100% relative humidity inside.

7. The process as set forth in claim 1, wherein said impact modified polyester has an oxygen permeability of from about 0.2 to about 1.0 cc-mil/100 in$^2$-24 hr-atm at 23° C. and 60% relative humidity outside/100% relative humidity inside.

8. The process as set forth in claim 1, wherein in step (a) said composition includes a compatibilizer means.

9. The process as set forth in claim 8, wherein said compatibilizer means is selected from the group consisting of polycarbonate, acetal, aromatic polyketone, acrylonitrile, polyamide-imide, polyacrylate, polyetherimide, polyamide, polyphenylene oxide, polyphenylene sulfide, polyimide, polyarylsulfone, polysulfone, polyurethanes, and epoxy resins.

10. The process as set forth in claim 1, wherein in step (a) said composition includes a nucleant means.

11. The process as set forth in claim 1, wherein in step (a) said composition includes a filler or a reinforcing agent means.

12. The process as set forth in claim 11, wherein in step (a) said filler or reinforcing agent means is selected from the group consisting of glass fiber, carbon fiber, ceramic fiber, metal fiber, inorganic minerals and particulates.

13. The process as set forth in claim 1, wherein in step (a) said composition includes a heat stabilizer means.

14. The process as set forth in claim 1, wherein in step (a) said composition includes a colorant means.

15. The process as set forth in claim 1, wherein in step (a) said polyester is selected from the group consisting of polyethylene terephthalate, polypropylene terephthalate, polybutylene terephthalate, polymethylpentene terephthalate, polyethylene naphthalate, polypropylene naphthalate, and polybutylene naphthalate.

16. The process as set forth in claim 1, wherein in step (a) said polyester means is polyethylene terephthalate homopolymer.

17. The process as set forth in claim 1, wherein in step (a) said heating is a temperature of from about 450° F. to about 610° F.

18. The process as set forth in claim 1, wherein in step (b) said impact modifier means is from about 0.1 to about 30% of the total composition by weight.

19. The process as set forth in claim 1, wherein step (a) and step (b) include mixing said composition.

20. The process as set forth in claim 1, wherein in step (c) said particle size is an average particle diameter of from about 0.1 to about 5 microns, with a standard deviation from the average particle diameter of from about 0.1 to about 2 microns.

21. The process as set forth in claim 20, wherein in step (c) said particle size is an average particle diameter from about 0.1 to about 2 microns, with a standard deviation from the average particle diameter of from about 0.1 to about 1 microns.

22. The process as set forth in claim 1, wherein in step (d) the heat of recrystallization is from about 0 to about −3.5 cal/g.

23. The process as set forth in claim 22, wherein in step (d) the heat of recrystallization is from about 0 to about −3.0 cal/g.

24. The process as set forth in claim 23, wherein in step (d) the heat of recrystallization is from about 0 to about −2.5 cal/g.

25. The process as set forth in claim 1, wherein in step (c) said cooling of the composition is at a rate from about 5° C. to about 80° C. per minute.

26. The process as set forth in claim 25, wherein in step (c) said cooling of the composition is at a rate from about 20° C. to about 80° C. per minute.

27. A process for producing a dimensionally stable, impact modified polyester with improved low temperature impact strength and improved gas barrier properties as set forth in claim 1 wherein in step (d) the contact surface temperature is at or above the peak crystallization range temperature from melt for the polyester.

28. A process for producing a dimensionally stable, impact modified polyester with improved low temperature impact strength and improved gas barrier properties as set forth in claim 1 wherein in step (d) the contact surface temperature is at the peak crystallization range temperature from melt for the polyester.

29. The process as set forth in claim 27 wherein the composition also contains at least one additive selected from the group of nucleants, colorants, heat stabilizers, mold release agents, trimming agents, and reinforcing agents.

30. The process as set forth in claim 28 wherein the composition also contains at least one additive selected from the group of nucleants, colorants, heat stabilizers, mold release agents, trimming agents, and reinforcing agents.

* * * * *